United States Patent
Addison et al.

(10) Patent No.: US 12,514,468 B2
(45) Date of Patent: Jan. 6, 2026

(54) PATIENT POSITION MONITORING METHODS AND SYSTEMS

(71) Applicant: Covidien LP, Mansfield, MA (US)

(72) Inventors: Paul S. Addison, MLN (GB); Dean Montgomery, Edinburgh (GB); Michael J. Addison, Edinburgh (GB); Philip C. Smit, Hamilton (GB)

(73) Assignee: Covidien LP, Mansfield, MA (US)

( * ) Notice: Subject to any disclaimer, the term of this patent is extended or adjusted under 35 U.S.C. 154(b) by 1045 days.

(21) Appl. No.: 17/456,866

(22) Filed: Nov. 29, 2021

(65) Prior Publication Data

US 2022/0167880 A1  Jun. 2, 2022

Related U.S. Application Data

(60) Provisional application No. 63/120,598, filed on Dec. 2, 2020.

(51) Int. Cl.
*A61B 5/145* (2006.01)
*A61B 5/00* (2006.01)
(Continued)

(52) U.S. Cl.
CPC .......... *A61B 5/1128* (2013.01); *A61B 5/1116* (2013.01); *A61B 5/1176* (2013.01); *G06N 20/00* (2019.01)

(58) Field of Classification Search
None
See application file for complete search history.

(56) References Cited

U.S. PATENT DOCUMENTS

| 5,107,845 A | 4/1992 | Guern et al. |
| 5,408,998 A | 4/1995 | Mersch |

(Continued)

FOREIGN PATENT DOCUMENTS

| CA | 2234191 A1 | 10/1998 |
| CN | 106725410 A | 5/2017 |

(Continued)

OTHER PUBLICATIONS

Amazon, "Dockem Koala Tablet Wall Mount Dock for iPad Air/Mini/Pro, Samsung Galaxy Tab/Note, Nexus 7/10, and More (Black Brackets, Screw-in Version)", https://www.amazon.com/Tablet-Dockem-Samsung-Brackets-Version-dp/B00JV75FC6?th=1, First available Apr. 22, 2014, viewed on Nov. 16, 2021, Apr. 22, 2014, 4 pages.

(Continued)

*Primary Examiner* — Benjamin S Melhus
(74) *Attorney, Agent, or Firm* — Draft Masters IP, LLC

(57) ABSTRACT

Methods and systems for monitoring a patient's position using non-contact patient monitoring systems are described. In some embodiments, depth sensing cameras are used to obtain depth images of a patient, wherein data can be extracted from the depth images and processed in various ways to make a determination as to the patient's position, including monitoring when and how often a patient changes position. Various alarms systems can also be integrated into the systems and methods described herein in order to alert clinicians regarding, for example, patients moving too infrequently, patients moving too frequently, or patients moving into undesirable positions in view of the condition being treated. AI-based patient monitoring systems used for determining patient position are also described.

17 Claims, 17 Drawing Sheets

(51) Int. Cl.
*A61B 5/11* (2006.01)
*A61B 5/1171* (2016.01)
*G06N 20/00* (2019.01)

(56) References Cited

U.S. PATENT DOCUMENTS

| | | |
|---|---|---|
| 5,704,367 A | 1/1998 | Ishikawa et al. |
| 5,800,360 A | 9/1998 | Kisner et al. |
| 5,995,856 A | 11/1999 | Mannheimer et al. |
| 6,241,684 B1 | 6/2001 | Amano et al. |
| 6,668,071 B1 | 12/2003 | Minkin et al. |
| 6,920,236 B2 | 7/2005 | Prokoski |
| 7,431,700 B2 | 10/2008 | Aoki et al. |
| 7,558,618 B1 | 7/2009 | Williams |
| 8,149,273 B2 | 4/2012 | Liu et al. |
| 8,754,772 B2 | 6/2014 | Horng et al. |
| 8,792,969 B2 | 7/2014 | Bernal et al. |
| 8,971,985 B2 | 3/2015 | Bernal et al. |
| 9,226,691 B2 | 1/2016 | Bernal et al. |
| 9,282,725 B2 | 3/2016 | Jensen-Jarolim et al. |
| 9,301,710 B2 | 4/2016 | Mestha et al. |
| 9,402,601 B1 | 8/2016 | Berger et al. |
| 9,436,984 B2 | 9/2016 | Xu et al. |
| 9,443,289 B2 | 9/2016 | Xu et al. |
| 9,504,426 B2 | 11/2016 | Kyal et al. |
| 9,508,141 B2 | 11/2016 | Khachaturian et al. |
| 9,607,138 B1 | 3/2017 | Baldwin et al. |
| 9,662,022 B2 | 5/2017 | Kyal et al. |
| 9,693,693 B2 | 7/2017 | Farag et al. |
| 9,693,710 B2 | 7/2017 | Mestha et al. |
| 9,697,599 B2 | 7/2017 | Prasad et al. |
| 9,750,461 B1 | 9/2017 | Telfort |
| 9,839,756 B2 | 12/2017 | Klasek |
| 9,943,371 B2 | 4/2018 | Bresch et al. |
| 10,213,540 B2 | 2/2019 | Burbank et al. |
| 10,278,585 B2 | 5/2019 | Ferguson et al. |
| 10,376,147 B2 | 8/2019 | Wood et al. |
| 10,398,353 B2 | 9/2019 | Addison et al. |
| 10,447,972 B2 | 10/2019 | Patil |
| 10,489,912 B1 | 11/2019 | Brailovskiy |
| 10,523,852 B2 | 12/2019 | Tzvieli et al. |
| 10,588,779 B2 | 3/2020 | Vorhees et al. |
| 10,589,916 B2 | 3/2020 | Mcrae |
| 10,650,585 B2 | 5/2020 | Kiely |
| 10,667,723 B2 | 6/2020 | Jacquel et al. |
| 10,702,188 B2 | 7/2020 | Addison et al. |
| 10,729,357 B2 | 8/2020 | Larson et al. |
| 10,874,331 B2 | 12/2020 | Kaiser et al. |
| 10,937,296 B1 | 3/2021 | Kukreja et al. |
| 10,939,824 B2 | 3/2021 | Addison et al. |
| 10,939,834 B2 | 3/2021 | Khwaja et al. |
| 10,966,059 B1 | 3/2021 | Dayal et al. |
| 11,311,252 B2 | 4/2022 | Jacquel et al. |
| 11,315,275 B2 | 4/2022 | Addison et al. |
| 11,317,828 B2 | 5/2022 | Addison et al. |
| 11,350,850 B2 | 6/2022 | Jacquel et al. |
| 11,850,026 B2 | 12/2023 | Levi et al. |
| 2002/0137464 A1 | 9/2002 | Dolgonos et al. |
| 2004/0001633 A1 | 1/2004 | Caviedes |
| 2004/0258285 A1 | 12/2004 | Hansen et al. |
| 2005/0203348 A1 | 9/2005 | Shihadeh et al. |
| 2007/0116328 A1 | 5/2007 | Sablak et al. |
| 2008/0001735 A1 | 1/2008 | Tran |
| 2008/0108880 A1 | 5/2008 | Young et al. |
| 2008/0279420 A1 | 11/2008 | Masticola et al. |
| 2008/0295837 A1 | 12/2008 | Mccormick et al. |
| 2009/0024012 A1 | 1/2009 | Li et al. |
| 2009/0141124 A1 | 6/2009 | Liu et al. |
| 2009/0304280 A1 | 12/2009 | Aharoni et al. |
| 2010/0210924 A1 | 8/2010 | Parthasarathy et al. |
| 2010/0236553 A1 | 9/2010 | Jafari et al. |
| 2010/0249630 A1 | 9/2010 | Droitcour et al. |
| 2010/0324437 A1 | 12/2010 | Freeman et al. |
| 2011/0144517 A1 | 6/2011 | Cervantes |
| 2011/0150274 A1 | 6/2011 | Patwardhan et al. |
| 2012/0065533 A1 | 3/2012 | Carrillo et al. |
| 2012/0075464 A1 | 3/2012 | Derenne et al. |
| 2012/0195473 A1 | 8/2012 | De Haan et al. |
| 2012/0243797 A1 | 9/2012 | Di Venuto Dayer et al. |
| 2013/0073312 A1 | 3/2013 | Thompson et al. |
| 2013/0267873 A1 | 10/2013 | Fuchs |
| 2013/0271591 A1 | 10/2013 | Van Leest et al. |
| 2013/0272393 A1 | 10/2013 | Kirenko et al. |
| 2013/0275873 A1 | 10/2013 | Shaw et al. |
| 2013/0324830 A1 | 12/2013 | Bernal et al. |
| 2013/0324876 A1 | 12/2013 | Bernal et al. |
| 2014/0023235 A1 | 1/2014 | Cennini et al. |
| 2014/0052006 A1 | 2/2014 | Lee et al. |
| 2014/0053840 A1 | 2/2014 | Liu |
| 2014/0073860 A1 | 3/2014 | Urtti |
| 2014/0139405 A1 | 5/2014 | Ribble et al. |
| 2014/0140592 A1 | 5/2014 | Lasenby et al. |
| 2014/0235976 A1 | 8/2014 | Bresch et al. |
| 2014/0267718 A1 | 9/2014 | Govro et al. |
| 2014/0272860 A1 | 9/2014 | Peterson et al. |
| 2014/0275832 A1 | 9/2014 | Muehlsteff et al. |
| 2014/0276104 A1 | 9/2014 | Tao et al. |
| 2014/0330336 A1 | 11/2014 | Errico et al. |
| 2014/0334697 A1 | 11/2014 | Kersten et al. |
| 2014/0358017 A1 | 12/2014 | Op Den Buijs et al. |
| 2014/0378810 A1 | 12/2014 | Davis et al. |
| 2014/0379369 A1 | 12/2014 | Kokovidis et al. |
| 2015/0003723 A1 | 1/2015 | Huang et al. |
| 2015/0068069 A1 | 3/2015 | Tran et al. |
| 2015/0094597 A1 | 4/2015 | Mestha et al. |
| 2015/0131880 A1 | 5/2015 | Wang et al. |
| 2015/0157269 A1 | 6/2015 | Lisogurski et al. |
| 2015/0198707 A1 | 7/2015 | Al-Alusi |
| 2015/0223731 A1 | 8/2015 | Sahin |
| 2015/0238150 A1 | 8/2015 | Subramaniam |
| 2015/0265187 A1 | 9/2015 | Bernal et al. |
| 2015/0282724 A1 | 10/2015 | Mcduff et al. |
| 2015/0286779 A1 | 10/2015 | Bala et al. |
| 2015/0301590 A1 | 10/2015 | Furst et al. |
| 2015/0317814 A1 | 11/2015 | Johnston et al. |
| 2015/0379370 A1 | 12/2015 | Clifton et al. |
| 2016/0000335 A1 | 1/2016 | Khachaturian et al. |
| 2016/0049094 A1 | 2/2016 | Gupta et al. |
| 2016/0082222 A1 | 3/2016 | Garcia Molina et al. |
| 2016/0140828 A1 | 5/2016 | Deforest |
| 2016/0143598 A1 | 5/2016 | Rusin et al. |
| 2016/0151022 A1 | 6/2016 | Berlin et al. |
| 2016/0156835 A1 | 6/2016 | Ogasawara et al. |
| 2016/0174887 A1 | 6/2016 | Kirenko et al. |
| 2016/0210747 A1 | 7/2016 | Hay et al. |
| 2016/0235344 A1 | 8/2016 | Auerbach |
| 2016/0310084 A1 | 10/2016 | Banerjee et al. |
| 2016/0317041 A1 | 11/2016 | Porges et al. |
| 2016/0345931 A1 | 12/2016 | Xu et al. |
| 2016/0367186 A1 | 12/2016 | Freeman et al. |
| 2017/0007342 A1 | 1/2017 | Kasai et al. |
| 2017/0007795 A1 | 1/2017 | Pedro et al. |
| 2017/0055877 A1 | 3/2017 | Niemeyer |
| 2017/0065484 A1 | 3/2017 | Addison et al. |
| 2017/0071516 A1 | 3/2017 | Bhagat et al. |
| 2017/0095215 A1 | 4/2017 | Watson et al. |
| 2017/0095217 A1 | 4/2017 | Hubert et al. |
| 2017/0119340 A1 | 5/2017 | Nakai et al. |
| 2017/0147772 A1 | 5/2017 | Meehan et al. |
| 2017/0164904 A1 | 6/2017 | Kirenko |
| 2017/0172434 A1 | 6/2017 | Amelard et al. |
| 2017/0173262 A1 | 6/2017 | Veltz |
| 2017/0238805 A1 | 8/2017 | Addison et al. |
| 2017/0238842 A1 | 8/2017 | Jacquel et al. |
| 2017/0311887 A1 | 11/2017 | Leussler et al. |
| 2017/0319114 A1 | 11/2017 | Kaestle |
| 2018/0042486 A1 | 2/2018 | Yoshizawa et al. |
| 2018/0042500 A1 | 2/2018 | Liao et al. |
| 2018/0049669 A1 | 2/2018 | Vu et al. |
| 2018/0053392 A1 | 2/2018 | White et al. |
| 2018/0104426 A1 | 4/2018 | Oldfield et al. |
| 2018/0106897 A1 | 4/2018 | Shouldice et al. |
| 2018/0169361 A1 | 6/2018 | Dennis et al. |
| 2018/0217660 A1 | 8/2018 | Dayal et al. |

(56) References Cited

U.S. PATENT DOCUMENTS

| | | |
|---|---|---|
| 2018/0228381 A1 | 8/2018 | Leboeuf et al. |
| 2018/0303351 A1 | 10/2018 | Mestha et al. |
| 2018/0310844 A1 | 11/2018 | Tezuka et al. |
| 2018/0325420 A1 | 11/2018 | Gigi |
| 2018/0333050 A1 | 11/2018 | Greiner et al. |
| 2018/0333102 A1 | 11/2018 | De Haan et al. |
| 2018/0352150 A1 | 12/2018 | Purwar et al. |
| 2019/0050985 A1 | 2/2019 | Den Brinker et al. |
| 2019/0133499 A1 | 5/2019 | Auerbach |
| 2019/0142274 A1 | 5/2019 | Addison et al. |
| 2019/0199970 A1 | 6/2019 | Greiner et al. |
| 2019/0209046 A1 | 7/2019 | Addison et al. |
| 2019/0209083 A1 | 7/2019 | Wu et al. |
| 2019/0307365 A1 | 10/2019 | Addison et al. |
| 2019/0311101 A1 | 10/2019 | Nienhouse |
| 2019/0343480 A1 | 11/2019 | Shute et al. |
| 2019/0380599 A1 | 12/2019 | Addison et al. |
| 2019/0380807 A1 | 12/2019 | Addison et al. |
| 2020/0046302 A1 | 2/2020 | Jacquel et al. |
| 2020/0187827 A1 | 6/2020 | Addison et al. |
| 2020/0202154 A1 | 6/2020 | Wang et al. |
| 2020/0205734 A1 | 7/2020 | Mulligan et al. |
| 2020/0237225 A1 | 7/2020 | Addison et al. |
| 2020/0242790 A1 | 7/2020 | Addison et al. |
| 2020/0250406 A1 | 8/2020 | Wang et al. |
| 2020/0253560 A1 | 8/2020 | De Haan |
| 2020/0279464 A1 | 9/2020 | Llewelyn |
| 2020/0289024 A1 | 9/2020 | Addison et al. |
| 2020/0329976 A1 | 10/2020 | Chen et al. |
| 2020/0409383 A1 | 12/2020 | Maunder |
| 2021/0068670 A1 | 3/2021 | Redtel |
| 2021/0142874 A1 | 5/2021 | Llewelyn |
| 2021/0153746 A1 | 5/2021 | Addison et al. |
| 2021/0201517 A1 | 7/2021 | Yang et al. |
| 2021/0233631 A1 | 7/2021 | Llewelyn |
| 2021/0235992 A1 | 8/2021 | Addison |
| 2021/0295662 A1 | 9/2021 | Bugbee et al. |
| 2021/0313075 A1 | 10/2021 | McNamara et al. |
| 2022/0211296 A1 | 7/2022 | Addison et al. |
| 2023/0122367 A1 | 4/2023 | Tesar |

FOREIGN PATENT DOCUMENTS

| | | |
|---|---|---|
| CN | 111728602 A | 10/2020 |
| CN | 112233813 A | 1/2021 |
| DE | 19741982 A1 | 10/1998 |
| EP | 2793189 B1 | 11/2016 |
| EP | 2428162 B1 | 8/2017 |
| EP | 3207862 A1 | 8/2017 |
| EP | 3207863 A1 | 8/2017 |
| EP | 3384827 A1 | 10/2018 |
| EP | 2772828 B1 | 1/2019 |
| JP | 2004173010 A | 6/2004 |
| JP | 2004283373 A | 10/2004 |
| JP | 3744778 B2 | 12/2005 |
| JP | 2009544080 A | 12/2009 |
| JP | 2011130996 A | 7/2011 |
| KR | 101644843 B1 | 8/2016 |
| RS | 20120373 A1 | 4/2014 |
| WO | 2004100067 A2 | 11/2004 |
| WO | 2005079658 A2 | 9/2005 |
| WO | 2010034107 A1 | 4/2010 |
| WO | 2010036653 A1 | 4/2010 |
| WO | 2015059700 A1 | 4/2015 |
| WO | 2015078735 A1 | 6/2015 |
| WO | 2015110859 A1 | 7/2015 |
| WO | 2016065411 A1 | 5/2016 |
| WO | 2016178141 A1 | 11/2016 |
| WO | 2016209491 A1 | 12/2016 |
| WO | 2017060463 A1 | 4/2017 |
| WO | 2017089139 A1 | 6/2017 |
| WO | 2017100188 A2 | 6/2017 |
| WO | 2017144934 A1 | 8/2017 |
| WO | 2018042376 A1 | 3/2018 |
| WO | 2019094893 A1 | 5/2019 |
| WO | 2019135877 A1 | 7/2019 |
| WO | 2019240991 A1 | 12/2019 |
| WO | 2020033613 A1 | 2/2020 |
| WO | 2021044240 A1 | 3/2021 |

OTHER PUBLICATIONS

Gsmarena, "Apple iPad Pro 11 (2018)", https://www.gsmarena.com/apple_ipad_pro_11_(2018)-9386.pjp, viewed on Nov. 16, 2021, 1 page.

"European Search Report", European Application No. 17156334.9, Applicant: Covidien LP, Aug. 23, 2017, 10 pages.

"European Search Report", European Patent Application No. 17156337.2, Applicant: Covidien LP, Aug. 23, 2017, 10 pages.

"International Search Report and Written Opinion", International Application No. PCT/US2018/060648, Jan. 28, 2019, 17 pages.

"International Search Report and Written Opinion", International Application No. PCT/US2018/065492, Mar. 8, 2019, 12 pages.

"International Search Report and Written Opinion", International Application No. PCT/US19/035433, Nov. 11, 2019, 17 pages.

"International Search Report and Written Opinion", International Application No. PCT/US2019/045600, Oct. 23, 2019, 19 pages.

"Invitation to Pay Additional Fees and Partial International Search Report", International Application No. PCT/US2019/035433, Sep. 13, 2019, 16 pages.

"Medical Electrical Equipment, Part 2-61: Particular requirements for basic safety and essential performance of pulse oximeter equipment", BSI Standards Publication, BS EN ISO 80601-2-61, 2011, 98 pages.

Aarts, Lonneke A.M., et al., "Non-contact heart rate monitoring utilizing camera photoplethysmography in neonatal Intensive care unit—A Pilot Study", Early Human Development 89, 2013, pp. 943-948, 6 pages.

Abbas, A.K., et al., "Neonatal non-contact respiratory monitoring based on real-time infrared thermography", Biomed. Eng. Online, vol. 10, No. 93, 2011, 17 pages.

Addison, Paul S., "A Review of Signal Processing Used in the Implementation of the Pulse Oximetry Photoplethysmographic Fluid Responsiveness Parameter", International Anesthesia Research Society, vol. 119, No. 6, Dec. 2014, pp. 1293-1306, 14 pages.

Addison, Paul S., et al., "Developing an algorithm for pulse oximetry derived respirator rate (RRoxi): a healthy volunteer study", J Clin comput, No. 26, 2012, pp. 45-51, 7 pages.

Addison, Paul S., et al., "Pulse oximetry-derived respiratory rate in general care floor patients", J. Clin Monit Comput, No. 29, 2015, pp. 113-120, 8 pages.

Addison, P.S., et al., "Video-based Heart Rate Monitoring across a Range of Skin Pigmentations during an Acute Hypoxic Challenge", J Clin Monit Comput, vol. 9, Nov. 9, 2017, 15 pages.

Amelard, et al., "Non-contact transmittance photoplethysmographic imaging (PPGI) for long-distance cardiovascular monitoring", ResearchGate, XP055542534 [Retrieved online Jan. 15, 2019], Mar. 23, 2015, pp. 1-13, 14 pages.

Armanian, A. M., "Caffeine administration to prevent apnea in very premature infants", Pediatrics & Neonatology, 57(5), 2016, pp. 408-412, 5 pages.

Barone, S, et al., "Computer-aided modelling of three-dimensional maxillofacial tissues through multi-modal imaging", Proceedings of the Institution of Mechanical Engineers, Journal of Engineering in Medicine, Part H vol. 227, No. 2, Feb. 1, 2013, 1 page.

Barone, S, et al., "Creation of 3D Multi-body Orthodontic Models by Using Independent Imaging Sensors", Senros MDPI AG Switzerland, vol. 13, No. 2, Jan. 1, 2013, pp. 2033-2050, 18 pages.

Bhattacharya, S., et al., "A Novel Classification Method for Predicting Acute Hypotensive Episodes in Critical Care", 5th ACM Conference on Bioinformatics, Computational Bilogy and Health Informatics (ACM-BCB 2014), Newport Beach, USA, 2014, 10 pages.

Bhattacharya, S., et al., "Unsupervised learning using Gaussian Mixture Copula models", 21st International Conference on Computational Statistics (COMPSTAT 2014), Geneva, Switzerland, 2014, pp. 523-530, 8 pages.

(56) References Cited

OTHER PUBLICATIONS

Bickler, Philip E., et al., "Factors Affecting the Performance of 5 Cerebral Oximeters During Hypoxia in Healthy Volunteers", Society for Technology in Anesthesia, vol. 117, No. 4, Oct. 2013, pp. 813-823, 11 pages.

Bousefsaf, Frederic, et al., "Continuous wavelet filtering on webcam photoplethysmographic signals to remotely assess the instantaneous heart rate", Biomedical Signal Processing and Control 8, 2013, pp. 568-574, 7 pages.

Bruser, C., et al., "Adaptive Beat-to-Beat Heart Rate Estimation in Ballistocardiograms", IEEE Transactions Information Technology in Biomedicine, vol. 15, No. 5, Sep. 2011, pp. 778-786, 9 pages.

Cennini, Giovanni, et al., "Heart rate monitoring via remote photoplethysmography with motion artifacts reduction", Optics Express, vol. 18, No. 5, Mar. 1, 2010, pp. 4867-4875, 9 pages.

Colantonio, S., et al., "A smart mirror to promote a healthy lifestyle", Biosystems Engineering. vol. 138, Innovations in Medicine and Healthcare, Oct. 2015, pp. 33-43, 11 pages.

Cooley, et al., "An Alorithm for the Machine Calculation of Complex Fourier Series", Aug. 17, 1964, pp. 297-301, 5 bages.

Di Fiore, J.M., et al., "Intermittent hypoxemia and oxidative stress in preterm infants", Respiratory Physiology & Neurobiology, No. 266, 2019, pp. 121-129, 25 pages.

"International Search Report and Written Opinion", International Application No. PCT/US2021/015669, Apr. 12, 2021, 15 pages.

Bartula, M., et al., "Camera-based System for Sontactless Monitoring of Respiration", 2013 35th Annual International Conference of the IEEE Engineering in Medicine and Biology Society (EMBC), Jul. 3, 2013, pp. 2672-2675, 4 pages.

Fischer, et al., "ReMoteCare: Health Monitoring with Streaming Video", OCMB '08, 7th International Conference on Mobile Business, IEEE, Piscataway, NJ,, Jul. 7, 2008, pp. 280-286.

Lawrence, E., et al., "Data Collection, Correlation and Dissemination of Medical Sensor information in a WSN", IEEE 2009 Fifth International Conference on Networking and Services, 978-0-7695-3586-9/09, Apr. 20, 2009, pp. 402-408, 7 pages.

Mukherjee, S., et al., "Patient health management system using e-health monitoring architecture", IEEE, International Advance Computing Conference (IACC), 978-1-4799-2572-8/14, Feb. 21, 2014, pp. 400-405, 6 pages.

Reyes, B.A., et al., "Tidal Volume and Instantaneous Respiration Rate Estimation using a Volumetric Surrogate Signal Acquired via a Smartphone Camera", IEEE Journal of Biomedical and Health Informatics, vol. 21(3), Feb. 25, 2016, pp. 764-777, 15 pages.

Srinivas, J., et al., "A Mutual Authentication Framework for Wireless Medical Sensor Networks", Journal of Medical Systems, 41:80, 2017, pp. 1-19, 19 pages.

Transue, S., et al., "Real-time Tidal Volume Estimation using Iso-surface Reconstruction", 2016 IEEE First International Conference on Connected Health: Applications, Systems and Engineering Technologies (CHASE), Jun. 27, 2016, pp. 209-218, 10 pages.

Yu, M.C., et al., "Noncontact Respiratory Measurement of Volume Change Using Depth Camera", 2012 Annual International Conference of the IEEE Engeineering in Medicine and Biology Society, Aug. 28, 2012, pp. 2371-2374, 4 pages.

Sokooti, Hess, et al., "Hierarchical Prediction of Registration Misalignment Using a Convolutional LSTM: Application to Chest CT Scans", IEEE Access, IEEE, USA, vol. 9, Apr. 20, 2021, 62008-62020, 13 pages.

Villarroel, Mauricio, et al., "Continuous non-contact vital sign monitoring in neonatal intensive care unit", Healthcare Technology Letters, vol. 1, Issue 3, 2014, pp. 87-91, 5 pages.

Wadhwa, N., et al., "Phase-Based Video Motion Processing", MIT Computer Science and Artificial Intelligence Lab, Jul. 2013, 9 pages.

Wadhwa, N., et al., "Riesz pyramids for fast phase-based video magnification", In Proc. of IEEE International Conference on Computational Photography (ICCP), Santa Clara, CA, 2014, 10 pages.

Wang, W., et al., "Exploiting spatial redundancy of image sensor for motion robust rPPG", IEEE Transactions on Biomedical Engineering, vol. 62, No. 2, 2015, pp. 415-425, 11 pages.

Wu, H.Y., et al., "Eulerian video magnifcation for revealing subtle changes in the world", ACM Transactions on Graphics (TOG), vol. 31, No. 4, 2012, pp. 651-658, 8 pages.

Wulbrand, H., et al., "Submental and diaphragmatic muscle activity during and at resolution of mixed and obstructive apneas and cardiorespiratory arousal in preterm infants", Pediatric Research, No. 38(3), 1995, pp. 298-305, 9 pages.

Zaunseder, et al., "Spatio-temporal analysis of blood perfusion by imaging photoplethysmography", Progress in Biomedical Optics and Imaging, SPIE-International Society for Optical Engineering, vol. 10501, Feb. 20, 2018, 15 pages.

Zhou, J., et al., "Maximum parsimony analysis of gene copy number changes in tumor phylogenetics", 15th International Workshop on Algorithms in Bioinformatics WABI 2015, Atlanta, USA, 2015, pp. 108-120, 13 pages.

Fei, J., et al., "Thermistor at a distance: unobtrusive measurement of breathing", IEEE Transactions on Biomedical Engineering, vol. 57, No. 4, 2010, pp. 968-998, 11 pages.

Feng, Litong, et al., "Dynamic ROI based on K-means for remote photoplethysmography", IEE International Conference on Accoustics, Speech and Signal Processing (ICASSP), Apr. 2015, pp. 1310-1314, 5 pages.

George, et al., "Respiratory Rate Measurement From PPG Signal Using Smart Fusion Technique", International Conference on Engineering Trends and Science & Humanities (ICETSH-2015), 2015, 5 pages.

Goldman, L.J., "Nasal airflow and thoracoabdominal motion in children using infrared thermographic video processing", Pediatric Pulmonology, vol. 47, No. 5, 2012, pp. 476-486, 11 pages.

Grimm, T., et al., "Sleep position classification from a depth camera using bed aligned maps", 23rd International Conference on Pattern Recognition (ICPR), Dec. 2016, pp. 319-324, 6 pages.

Guazzi, Alessandro R., et al., "Non-contact measurement of oxygen saturation with an RGB camera", Biomedical Optics Express, vol. 6, No. 9, Sep. 1, 2015, pp. 3320-3338, 19 pages.

Han, J., et al., "Visible and infrared image registration in man-made environments employing hybrid visuals features", Pattern Recognition Letters, vol. 34, No. 1, 2013, pp. 42-51, 10 pages.

Huddar, V., et al., "Predicting Postoperative Acute Respiratory Failure in Critical Care using Nursing Notes and Physiological Signals", 36th Annual International Conference of IEEE Engineering in Medicine and Biology Society (IEEE EMBC 2014), Chicago, USA, 2014, pp. 2702-2705, 4 pages.

Hyvarinen, A., et al., "Independent Component Analysis: Algorithms and Applications", Neural Networks, vol. 13, No. 4, 2000, pp. 411-430, 31 pages.

Javadi, M., et al., "Diagnosing Pneumonia in Rural Thailand: Digital Cameras versus Film Digitizers for Chest Radiograph Teleradiology", International Journal of Infectious Disease, 10(2), Mar. 2006, pp. 129-135, 7 pages.

Jopling, M. W., et al., "Issues in the Laboratory Evaluation of Pulse Oximeter Performance", Anesth. Analg., No. 94, 2002, pp. S62-S68, 7 pages.

Kastle, Siegfried W., et al., "Determining the Artifact Sensitivity of Recent Pulse Oximeters During Laboratory Benchmarking", Journal of Clinical Monitoring and Computing, vol. 16, No. 7, 2000, pp. 509-552, 14 pages.

Klaessens, J.H.G.M., et al., "Non-invasive skin oxygenation imaging using a multi-spectral camera system: Effectiveness of various concentration algorithms applied on human skin", Proc. of SPIE, vol. 7174 717408-1, 2009, 14 pages.

Kong, Lingqin, et al., "Non-contact detection of oxygen saturation based on visible light imaging device using ambient light", Optics Express, vol. 21, No. 15, Jul. 29, 2013, pp. 17646-17471, 8 pages.

Kortelainen, J.M., et al., "Sleep staging based on signals acquired through bed sensor", IEEE Transactions on Informational Technology in Biomedicine, vol. 14, No. 3, May 2010, pp. 776-785, 10 pages.

(56) References Cited

OTHER PUBLICATIONS

Kumar, M., et al., "Distance PPG: Robust non-contact vital signs monitoring using a camera", Biomedical Optics Express, vol. 6, No. 5, May 1, 2015, 24 pages.

Kwon, Sungjun, et al., "Validation of heart rate extraction using video imaging on a built-in camera system of a smartphone", 34th Annual International Conference of the IEEE EMBS, San Diego, CA, USA, Aug. 28-Sep. 1, 2012, pp. 2174-2177, 4 pages.

Lai, C.J., et al., "Heated humidified high-flow nasal oxygen prevents intraoperative body temperature decrease in non-Intubated thoracoscopy", Journal of Anesthesia, Oct. 15, 2018, 8 pages.

Li, et al., "A Non-Contact Vision-Based System for Respiratory Rate Estimation", IEEE 978-1-4244-7929-0/14, 2014, pp. 2119-2122, 4 pages.

Liu, H., et al., "A Novel Method Based on Two Cameras for Accurate Estimation of Arterial Oxygen Saturation", BioMedical Engineering Online, vol. 14, No. 52, 2015, 18 pages.

Liu, S., et al., "In-bed pose estimation: Deep learning with shallow dataset. IEEE journal of translational engineering in health and medicine", IEEE Journal of Translational Engineering in Health and Medicine, No. 7, 2019, pp. 1-12, 12 pages.

Liu, C., et al., "Motion Magnification", ACM Transactions on Graphics (TOG), vol. 24, No. 3, 2005, pp. 519-526, 8 pages.

Lv, et al., "Class Energy Image Analysis for Video Sensor-Based Gait Recognition: A Review", Sensors, No. 15, 2015, pp. 932-964, 33 pages.

Mcduff, Daniel J., et al., "A Survey of Remote Optical Photoplethysmographic Imaging Methods", IEEE 987-1-4244-0270-1/15, 2015, pp. 6398-6404, 7 pages.

Mestha, L.K., et al., "Towards Continuous Monitoring of Pulse Rate in Neonatal Intensive Care Unit with a Webcam", Proc. of 36th Annual Int. Conf. of the IEEE Engineering in Medicine and Biology Society, Chicago, IL, 2014, pp. 3817-3820, 4 pages.

Nguyen, et al., "3D shape, deformation and vibration measurements using infrared Kinect sensors and digital image correlation", Applied Optics, vol. 56, No. 32, Nov. 10, 2017, 8 pages.

Ni, et al., "RGBD-Camera Based Get-Up Event Detection for Hospital Fall Prevention", Acoustics, Speech and Signal Processing (ICASSP) 2012 IEEE International Conf., Mar. 2012, pp. 1405-1408, 6 pages.

Nisar, et al., "Contactless heart rate monitor for multiple persons in a video", IEEE International Conference on Consumer Electronics—Taiwan (ICCE-TW), XP03291229 [Retreived on Jul. 25, 2016], May 27, 2016, 2 pages.

Pereira, C., et al., "Noncontact Monitoring of Respiratory Rate in Newborn Infants Using Thermal Imaging", IEEE Transactions on Biomedical Engineering, Aug. 23, 2018, 10 pages.

Poh, et al., "Advancements in Noncontact, Multiparameter Physiological Measurements Using a Webcam", IEEE Transactions on Biomedical Engineering, vol. 58, No. 1, Jan. 2011, pp. 7-11, 5 pages.

Poh, et al., "Non-contact, automated cardiac pulse measurements using video imaging and blind source separation", OPT. Express 18, 2010, pp. 10762-10774, 14 pages.

Povsic, Klemen, et al., "Real-Time 3D visualization of the thoracoabdominal surface during breathing with body movement and deformation extraction", Physiological Measurement, vol. 36, No. 7, May 28, 2015, pp. 1497-1516, 22 pages.

Prochazka, et al., "Microsoft Kinect Visual and Depth Sensors for Breathing and Heart Rate Analysis", Senors, vol. 16, No. 7, Jun. 28, 2016, 11 pages.

Rajan, V., et al., "Clinical Decision Support for Stroke using Multiview Learning based Models for NIHSS Scores", PAKDD 2016 Workshop: Predictive Analytics in Critical Care (PACC), Auckland, New Zealand, 2016, pp. 190-199, 10 pages.

Rajan, V., et al., "Dependency Clustering of Mixed Data with Gaussian Mixture Copulas", 25th International Joint Conference on Artificial Intelligence IJCAI, New York, USA, 2016, pp. 1967-1973, 7 pages.

Reisner, A., et al., "Utility of the Photoplethysmogram in Circulatory Monitoring", American Society of Anesthesiologist, May 2008, pp. 950-958, 9 pages.

Rougier, Caroline, et al., "Robust Video Surveillance for Fall Detection Based on Human Shape Deformation", IEEE Transactions on Circuits and Systems for Video Technology, vol. 21, No. 5, May 2011, pp. 611-622, 12 pages.

Rubinstein, M, "Analysis and Visualization of Temporal Variations in Video", Department of Electrical Engineering and Computer Science, Massachusetts Institute of Technology, Feb. 2014, 118 pages.

Scalise, Lorenzo, et al., "Heart rate measurement in neonatal patients using a webcamera", Department of Industrial Engineering and Mathematical Science, Italy, 978-1-4673-0882-3/12, EEE, 2012, 4 pages.

Schaerer, J., et al., "Multi-dimensional respiratory motion tracking from markerless optical surface imaging based on deformable mesh registration", Physics in Medicine and Biology, vol. 57, No. 2, Dec. 14, 2011, pp. 357-373, 18 pages.

Sengupta, A., et al., "A Statistical Model for Stroke Outcome Prediction and Treatment Planning", 38th Annual International Conference of the IEE Engineering in Medicine and Biology (Society IEEE EMBC2016), Orlando, USA, 2016, pp. 2516-2519, 4 pages.

Shah, Nitin, et al., "Performance of three new-generation pulse oximeters during motion and low perfursion in volunteers", Journal of Clinical Anesthesia, No. 24, 2012, pp. 385-391, 7 pages.

Shao, Dangdang, et al., "Noncontact Monitoring Breathing Pattern, Exhalation Flow Rate and Pulse Transit Time", EEE Transactions on Biomedical Engineering, vol. 61, No. 11, Nov. 2014, pp. 2760-2767, 8 pages.

Shrivastava, H., et al., "Classification with Imbalance: A Similarity-based Method for Predicting Respiratory Failure", IEEE International Conference on Bioinformatics and Biomedicine (IEEE BIBM2015), Washington, DC,USA, 2015, pp. 707-714, 8 pages.

Sun, Yu, et al., "Motion-compensated noncontact imaging photoplethysmography to monitor cardiorespiratory status during exercise", Journal of Biomedical Optics, vol. 16, No. 7, Jul. 1, 2011, 10 pages.

Sun, Yu, et al., "Noncontact imaging photoplethysmography to effectively access pulse rate variability", Journal of Biomedical Optics, vol. 18(6), Jun. 2013, 10 pages.

Tamura, et al., "Wearable Photoplethysmographic Sensors-Past & Present", Electronics, vol. 3, 2014, pp. 282-302, 21 pages.

Tarassenko, L., et al., "Non-contact video-based vital sign monitoring using ambient light and auto-regressive models", Institute of Physics and Engineering in Medicine, vol. 35, 2014, pp. 807-831, 26 pages.

Teichmann, D., et al., "Non-Contact monitoring techniques-Principles and applications", In Proc. of IEEE International Conference of the Engineering in Medicine and Biology Society (EMBC), San Diego, CA, 2012, pp. 1302-1305, 4 pages.

Verkruysee, Wim, et al., "Calibration of Contactless Pulse Oximetry", Anesthesia & Analgesia, vol. 124, No. 1, Jan. 2017, pp. 136-145, 10 pages.

Al-Naji, Ali, et al., "Real Time Apnoea Monitoring of Children Using the Microsoft Kinect Sensor: A Pilot Study", Sensors, 17(286), Feb. 3, 2017, 15 pages.

Harte, James M., et al., "Chest wall motion analysis in healthy volunteers and adults with cystic fibrosis using a novel Kinect-based motion tracking system", Medical & Biological Engineering & Computing, 54(11), Feb. 13, 2016, pp. 1631-1640, 11 pages.

Rezaei, Mahdi, et al., "DeepSocial: Social Distancing Monitoring and Infection Risk Assessment in COVID-19 Pandemic", Applied Sciences, vol. 10, 7514, Oct. 26, 2020, pp. 1-29, 29 pages.

Sathyamoorthy, Adarsh Jagan, et al., "COVID-Robot: Monitoring Social Distancing Constraints in Crowded Scenarios", Aug. 21, 2020, pp. 1-11, 11 pages.

Liu, X., et al., "An Image Captioning Method for Infant Sleeping Environment Diagnosis", Springer International Publishing, May 15, 2019, pp. 18-26, 9 pages.

PATIENT POSITION MONITORING METHODS AND SYSTEMS

CROSS-REFERENCE TO RELATED APPLICATION(S)

The present application claims priority under 35 U.S.C. § 119(e) to U.S. Provisional Patent Application No. 63/120,598, entitled "Patient Position Monitoring Methods and Systems", filed Dec. 2, 2020, the entirety of which is incorporated herein by reference.

TECHNICAL FIELD

The present disclosure relates to methods and systems for monitoring a patient's position. In some embodiments, depth sensing cameras are used to obtain depth images of a patient, wherein data can be extracted from the depth images and processed in various ways to make a determination as to the patient's position, including monitoring when and how often a patient changes position. Various alarms systems can also be integrated into the systems and methods described herein in order to alert clinicians regarding, for example, patients moving too infrequently, patients moving too frequently, or patients moving into undesirable positions in view of their condition being treated. AI-based patient monitoring systems used for determining patient position are also described herein.

BACKGROUND

Patient treatment for and recovery from various conditions often requires a patient to remain in bed for an extended period of time. Different complications may arise from such prolonged periods in bed. For example, if a patient infrequently changes their position while in bed, the patient may develop bed ulcers. Alternatively, there may be instances where patient recovery requires a degree of patient immobility while in bed, such as in the case of a patient recovering from spinal surgery. Further still, it may be desirable for a patient's recovery that he or she not move into certain positions while in bed, such as in the case where an incision has been made in one side of the patient's body, in which case the clinician may want the patient to refrain from lying on that side of his or her body so as to not impede healing of the incision. However, it remains difficult fora clinician to manually monitor a patient over extended periods of time to try and avoid these types of complications. Accordingly, a need exists for automated methods and systems capable of monitoring patient positions while in bed to help avoid complications to treatment and recovery.

SUMMARY

Described herein are various embodiments of methods and systems for video-based monitoring of a patient, and more specifically, video-based monitoring of a patient's position while lying in bed. In one embodiment, a video-based patient monitoring method includes: obtaining a depth sensing image of a region of interest of a patient using a depth sensing camera, the depth sensing image comprising a plurality of depth measurements taken within the region of interest; extracting from the depth sensing image a subset of the plurality of depth measurements, the subset of depth measurements taken along a line extending through the region of interest; creating a cross-section profile image based on the subset of depth measurements; comparing the cross-section profile image to a plurality of standard cross-section profile images, each of the standard cross-section profile images being associated with a patient position; and making a determination of the patient's position based on the closest match between the cross-section profile image and one of the standard cross-section profile images.

In another embodiment, a video-based patient monitoring method incudes: continuously creating a cross-section profile of a patient, the cross-section profile being based on a plurality of depth measurements obtained from a depth sensing camera and taken along a line extending through a region of interest covering at least a portion of the patient; continuously determining the centroid of the cross-section profile; when a patient movement have occurred, plotting the change in horizontal location within the cross-section profile of the centroid during the patient movement; and from the plot, determining the change in the patient's positioning following the patient movement.

In another embodiment, a video-based patient monitoring method includes: determining a patient's position at a first time; setting a position flag as the patient's position at the first time; determining the patient's position at a second time; comparing the position flag to the patient's position at the second time; when the patient's position at the second time is the same as the position flag, determining if the elapsed time between the first time and the second time is greater than a threshold value; and when the elapsed time is greater than the threshold value, initiating an alarm.

In another embodiment, a video-based patient monitoring method includes: determining a patient's position at a first time; setting a position flag as the patient's position at the first time; determining the patient's position at a second time; comparing the position flag to the patient's position at the second time; and when the patient's position at the second time is different from the position flag, initiating an alarm.

In another embodiment, a video-based patient monitoring method includes: determining a patient's position at a first time; setting a position flag as the patient's position at the first time; determining the patient's position at a second time; comparing the position flag to the patient's position at the second time; when the patient's position at the second time is different from the position flag, adding a tally to a patient position change count; determining if the patient position change count exceeds a threshold value established for a predetermined period of time; and when the patient position change count exceeds the threshold value established for the predetermined period of time, initiating an alarm.

In another embodiment, a video-based patient monitoring method includes: determining a patient's position; comparing the patient's position to a list of prohibited patient positions; and when the patient's position matches a patient position on the list of prohibited patient positions, initiating an alarm In another embodiment, a video-based patient monitoring method includes: obtaining a plurality of depth measurements within a region of interest covering at least a portion of a patient using a depth sensing camera, the plurality of depth sensing measurements being taken along a line extending through the region of interest; creating a cross-section profile image based on the plurality of depth measurements; comparing the cross-section profile image to a plurality of standard cross-section profile images, each of the standard cross-section profile images being associated with a patient position; and making a determination of the patient's position based on the closest match between the cross-section profile image and one of the standard cross-section profile images.

In another embodiments, a video-based patient monitoring method includes: capturing at least one image stream of a patient, the at least one image stream including at least a region of interest of the patient; from the captured image stream, determining the position of the patient by analyzing the captured image stream using a machine learning module trained to determine the position of the patient; and reporting to a screen the determined patient position.

BRIEF DESCRIPTION OF THE DRAWINGS

Many aspects of the present disclosure can be better understood with reference to the following drawings. The components in the drawing are not necessarily to scale. Instead, emphasis is placed on illustrating clearly the principles of the present disclosure. The drawings should not be taken to limit the disclosure to the specific embodiments depicted but are for explanation and understanding only.

DETAILED DESCRIPTION

Specific details of several embodiment of the present technology are described herein with reference to FIGS. 1-12C. Although many of the embodiments are described with respect to devices, systems, and methods for video-based monitoring of a human patient's position when lying in bed, other applications and other embodiments in addition to those described herein are within the scope of the present technology. For example, at least some embodiments of the present technology can be useful for video-based monitoring of non-patients (e.g., elderly or neonatal individuals within their homes). It should be noted that other embodiments in addition to those disclosed herein are within the scope of the present technology. Further, embodiments of the present technology can have different configurations, components, and/or procedures than those shown or described herein. Moreover, a person of ordinary skill in the art will understand that embodiments of the present technology can have configurations, components, and/or procedures in addition to those shown or described herein and that these and other embodiments can be without several of the configurations, components, and/or procedures shown or described herein without deviating from the present technology.

Figure 1:
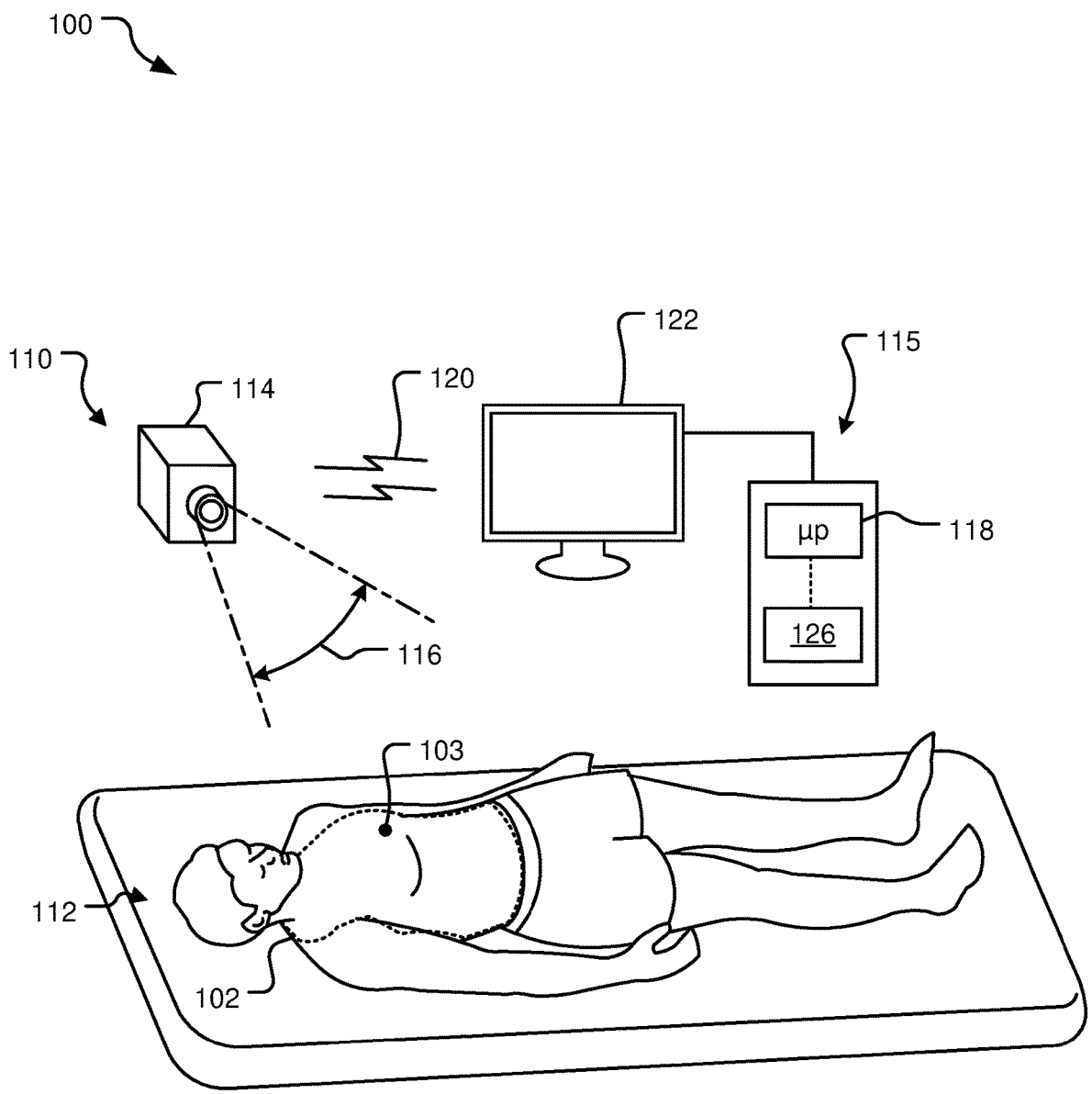
FIG. 1 is a schematic view of a video-based patient monitoring system configured in accordance with various embodiments of the present technology.

FIG. 1 is a schematic view of a patient 112 and a video-based patient monitoring system 100 configured in accordance with various embodiments of the present technology. The system 100 includes a non-contact detector 110 and a computing device 115. In some embodiments, the detector 110 can include one or more image capture devices, such as one or more video cameras. In the illustrated embodiment, the non-contact detector 110 includes a video camera 114. The non-contact detector 110 of the system 100 is placed remote from the patient 112. More specifically, the video camera 114 of the non-contact detector 110 is positioned remote from the patient 112 in that it is spaced apart from and does not contact the patient 112. The camera 114 includes a detector exposed to a field of view (FOV) 116 that encompasses at least a portion of the patient 112.

The camera 114 can capture a sequence of images over time. The camera 114 can be a depth sensing camera, such as a Kinect camera from Microsoft Corp. (Redmond, Washington) or Intel camera such as the D415, D435, and SR305 cameras from Intel Corp, (Santa Clara, California). A depth sensing camera can detect a distance between the camera and objects within its field of view. Such information can be used to determine that a patient 112 is within the FOV 116 of the camera 114 and/or to determine one or more regions of interest (ROI) to monitor on the patient 112. Once a ROI is identified, the ROI can be monitored over time, and the changes in depth of regions (e.g., pixels) within the ROI 102 can represent movements of the patient 112. While a depth sending camera 114 is described previously, it should be appreciated that other types of cameras using other imaging modalities (e.g., RGB, thermal, IR, etc.) can also be used in the systems and methods described herein.

In some embodiments, the system 100 determines a skeleton-like outline of the patient 112 to identify a point or points from which to extrapolate a ROI. For example, a skeleton-like outline can be used to find a center point of a chest, shoulder points, waist points, and/or any other points on a body of the patient 112. These points can be used to determine one or more ROIs. For example, a ROI 102 can be defined by filling in area around a center point 103 of the chest, as shown in FIG. 1. Certain determined points can define an outer edge of the ROI 102, such as shoulder points. In other embodiments, instead of using a skeleton, other points are used to establish a ROI. For example, a face can be recognized, and a chest area inferred in proportion and spatial relation to the face. In other embodiments, a reference point of a patient's chest can be obtained (e.g., through a previous 3-D scan of the patient), and the reference point can be registered with a current 3-D scan of the patient. In these and other embodiments, the system 100 can define a ROI around a point using parts of the patient 112 that are within a range of depths from the camera 114. In other words, once the system 100 determines a point from which to extrapolate a ROI, the system 100 can utilize depth information from the depth sensing camera 114 to fill out the ROI. For example, if the point 103 on the chest is selected, parts of the patient 112 around the point 103 that are a similar depth from the camera 114 as the point 103 are used to determine the ROI 102.

In another example, the patient 112 can wear specially configured clothing (not shown) that includes one or more features to indicate points on the body of the patient 112, such as the patient's shoulders and/or the center of the patient's chest. The one or more features can include visually encoded message (e.g., bar code, QR code, etc.), and/or brightly colored shapes that contrast with the rest of the patient's clothing. In these and other embodiments, the one or more features can include one or more sensors that are configured to indicate their positions by transmitting light or other information to the camera 114. In these and still other embodiments, the one or more features can include a grid or another identifiable pattern to aid the system 100 in recognizing the patient 112 and/or the patient's movement. In some embodiments, the one or more features can be stuck on the clothing using a fastening mechanism such as adhesive, a pin, etc. For example, a small sticker can be placed on a patient's shoulders and/or on the center of the patient's chest that can be easily identified within an image captured by the camera 114. The system 100 can recognize the one or more features on the patient's clothing to identify specific points on the body of the patient 112. In turn, the system 100 can use these points to recognize the patient 112 and/or to define a ROI.

In some embodiments, the system 100 can receive user input to identify a starting point for defining a ROI. For example, an image can be reproduced on a display 122 of the system 100, allowing a user of the system 100 to select a patient 112 for monitoring (which can be helpful where multiple objects are within the FOV 116 of the camera 114) and/or allowing the user to select a point on the patient 112 from which a ROI can be determined (such as the point 103 on the chest of the patient 112). In other embodiments, other methods for identifying a patient 112, identifying points on the patient 112, and/or defining one or more ROI's can be used.

Figure 2:
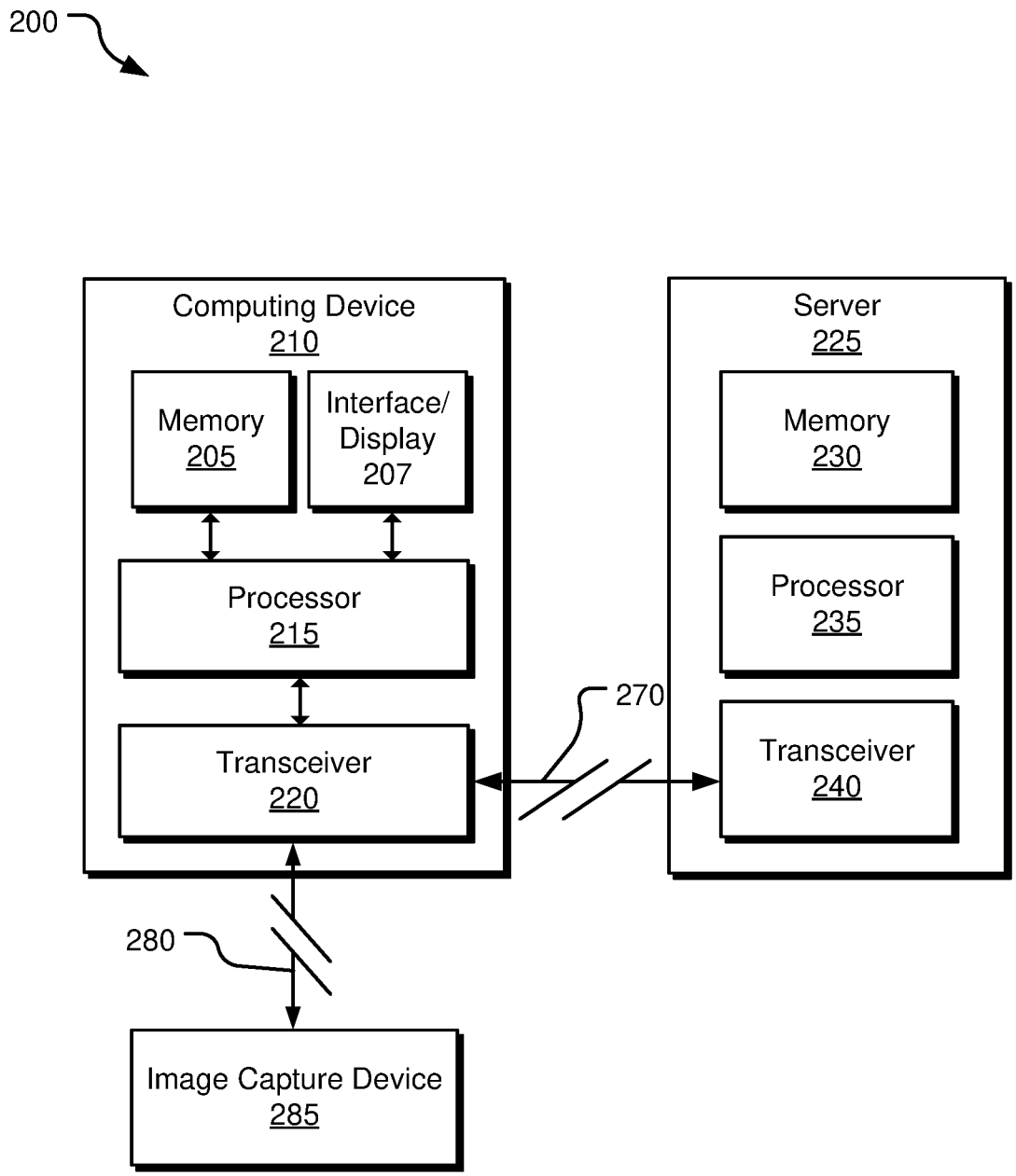
FIG. 2 is a block diagram illustrating a video-based patient monitoring system having a computing device, a server, and one or more image capturing devices, and configured in accordance with various embodiments of the present technology.

The images detected by the camera 114 can be sent to the computing device 115 through a wired or wireless connection 120. The computing device 115 can include a processor 118 (e.g., a microprocessor), the display 122, and/or hardware memory 126 for storing software and computer instructions. Sequential image frames of the patient 112 are recorded by the video camera 114 and sent to the processor 118 for analysis. The display 122 can be remote from the camera 114, such as a video screen positioned separately from the processor 118 and the memory 126. Other embodiments of the computing device 115 can have different, fewer, or additional components than shown in FIG. 1. In some embodiments, the computing device 115 can be a server. In other embodiments, the computing device 115 of FIG. 1 can be additionally connected to a server (e.g., as shown in FIG. 2 and discussed in greater detail below). The captured images/video can be processed or analyzed at the computing device 115 and/or a server to determine, e.g., a patient's position while lying in bed or a patient's change from a first position to second position while lying in bed. In some embodiments, some or all of the processing may be performed by the camera, such as by a processor integrated into the camera or when some or all of the computing device 115 is incorporated into the camera.

FIG. 2 is a block diagram illustrating a video-based patient monitoring system 200 (e.g., the video-based patient monitoring system 100 shown in FIG. 1) having a computing device 210, a server 225, and one or more image capture devices 285, and configured in accordance with various embodiments of the present technology. In various embodiments, fewer, additional, and/or different components can be used in the system 200. The computing device 210 includes a processor 215 that is coupled to a memory 205. The processor 215 can store and recall data and applications in the memory 205, including applications that process information and send commands/signals according to any of the methods disclosed herein. The processor 215 can also (i) display objects, applications, data, etc. on an interface/display 207 and/or (ii) receive inputs through the interface/display 207. As shown, the processor 215 is also coupled to a transceiver 220.

The computing device 210 can communicate with other devices, such as the server 225 and/or the image capture device(s) 285 via (e.g., wired or wireless) connections 270 and/or 280, respectively. For example, the computing device 210 can send to the server 225 information determined about a patient from images captured by the image capture device(s) 285. The computing device 210 can be the computing device 115 of FIG. 1. Accordingly, the computing device 210 can be located remotely from the image capture device(s) 285, or it can be local and close to the image capture device(s) 285 (e.g., in the same room). In various embodiments disclosed herein, the processor 215 of the computing device 210 can perform the steps disclosed herein. In other embodiments, the steps can be performed on a processor 235 of the server 225. In some embodiments, the various steps and methods disclosed herein can be performed by both of the processors 215 and 235. In some embodiments, certain steps can be performed by the processor 215 while others are performed by the processor 235. In some embodiments, information determined by the processor 215 can be sent to the server 225 for storage and/or further processing.

In some embodiments, the image capture device(s) 285 are remote sensing device(s), such as depth sensing video camera(s), as described above with respect to FIG. 1. In some embodiments, the image capture device(s) 285 can be or include some other type(s) of device(s), such as proximity sensors or proximity sensor arrays, heat or infrared sensors/cameras, sound/acoustic or radio wave emitters/detectors, or other devices that include a field of view and can be used to monitor the location and/or characteristics of a patient or a region of interest (ROI) on the patient. Body imaging technology can also be utilized according to the methods disclosed herein. For example, backscatter x-ray or millimeter wave scanning technology can be utilized to scan a patient, which can be used to define and/or monitor a ROI. Advantageously, such technologies can be able to "see" through clothing, bedding, or other materials while giving an accurate representation of the patient's skin. This can allow for more accurate measurements, particularly if the patient is wearing baggy clothing or is under bedding. The image capture device(s) 285 can be described as local because they are relatively close in proximity to a patient such that at least a part of a patient is within the field of view of the image capture device(s) 285. In some embodiments, the image capture device(s) 285 can be adjustable to ensure that the patient is captured in the field of view. For example, the image capture device(s) 285 can be physically movable, can have a changeable orientation (such as by rotating or panning), and/or can be capable of changing a focus, zoom, or other characteristic to allow the image capture device(s) 285 to adequately capture images of a patient and/or a ROI of the patient. In various embodiments, for example, the image capture device(s) 285 can focus on a ROI, zoom in on the ROI, center the ROI within a field of view by moving the image capture device(s) 285, or otherwise adjust the field of view to allow for better and/or more accurate tracking/measurement of the ROI.

The server 225 includes a processor 235 that is coupled to a memory 230. The processor 235 can store and recall data and applications in the memory 230. The processor 235 is also coupled to a transceiver 240. In some embodiments, the processor 235, and subsequently the server 225, can communicate with other devices, such as the computing device 210 through the connection 270.

The devices shown in the illustrative embodiment can be utilized in various ways. For example, either the connections 270 or 280 can be varied. Either of the connections 270 and 280 can be a hard-wired connection. A hard-wired connection can involve connecting the devices through a USB (universal serial bus) port, serial port, parallel port, or other type of wired connection that can facilitate the transfer of data and information between a processor of a device and a second processor of a second device. In another embodiment, either of the connections 270 and 280 can be a dock where one device can plug into another device. In other embodiments, either of the connections 270 and 280 can be a wireless connection. These connections can take the form of any sort of wireless connection, including, but not limited to, Bluetooth connectivity, Wi-Fi connectivity, infrared, visible light, radio frequency (RF) signals, or other wireless protocols/methods. For example, other possible modes of wireless communication can include near-field communications, such as passive radio-frequency identification (RFID) and active RFID technologies. RFID and similar near-field communications can allow the various devices to communicate in short range when they are placed proximate to one another. In yet another embodiment, the various devices can connect through an internet (or other network) connection. That is, either of the connections 270 and 280 can represent several different computing devices and network components that allow the various devices to communicate through the internet, either through a hard-wired or wireless connection. Either of the connections 270 and 280 can also be a combination of several modes of connection.

The configuration of the devices in FIG. 2 is merely one physical system 200 on which the disclosed embodiments can be executed. Other configurations of the devices shown can exist to practice the disclosed embodiments. Further, configurations of additional or fewer devices than the devices shown in FIG. 2 can exist to practice the disclosed embodiments. Additionally, the devices shown in FIG. 2 can be combined to allow for fewer devices than shown or can be separated such that more than the three devices exist in a system. It will be appreciated that many various combinations of computing devices can execute the methods and systems disclosed herein. Examples of such computing devices can include other types of medical devices and sensors, infrared cameras/detectors, night vision cameras/detectors, other types of cameras, augmented reality goggles, virtual reality goggles, mixed reality goggle, radio frequency transmitters/receivers, smart phones, personal computers, servers, laptop computers, tablets, blackberries, RFID enabled devices, smart watch or wearables, or any combinations of such devices.

Figure 3:
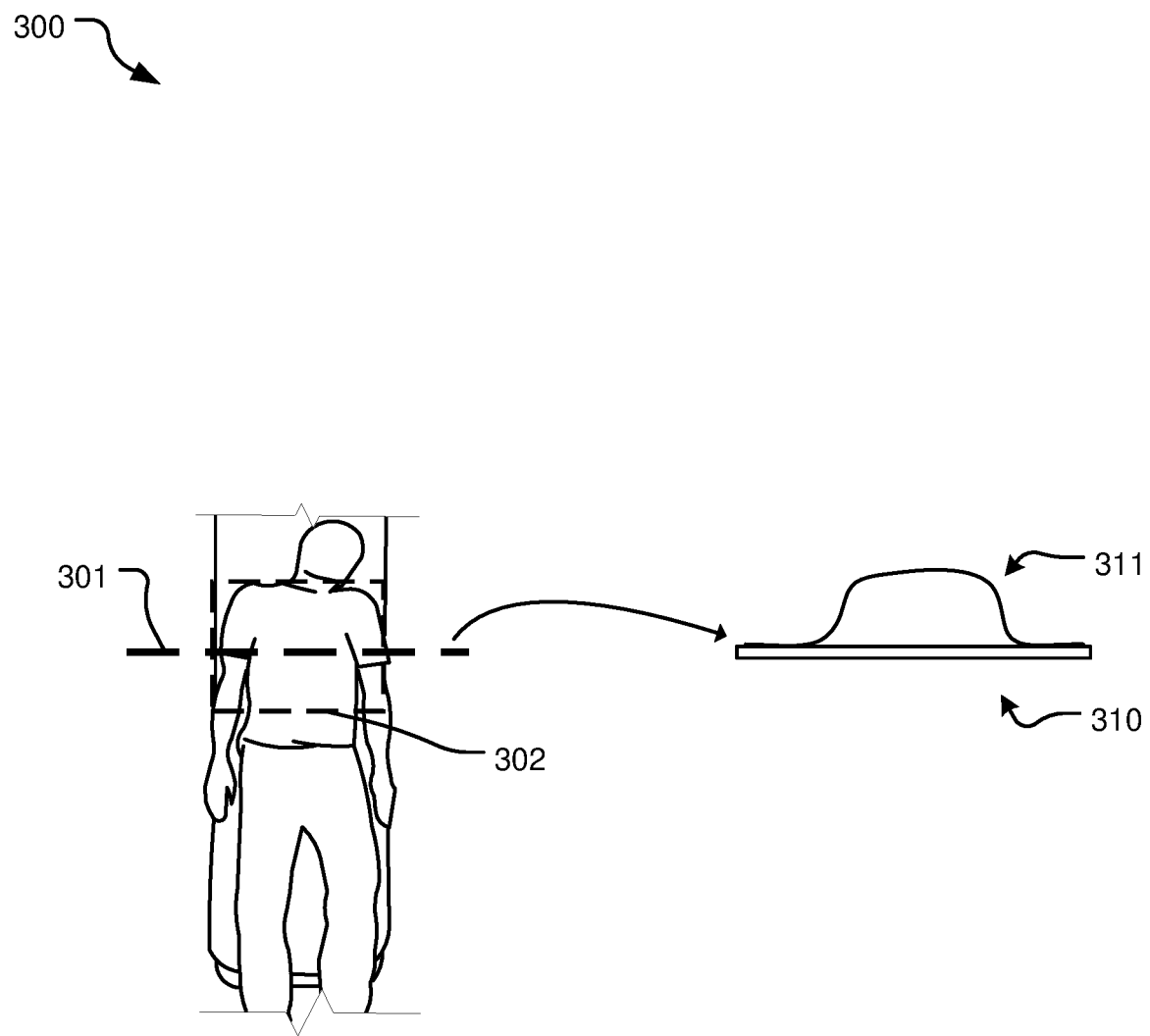
FIG. 3 is a depth sensing image and a cross-sectional depth plot extracted therefrom obtained using a video-based patient monitoring system configured in accordance with various embodiments of the present technology.

With reference to FIG. 3, embodiments of a method of determining a patient position generally employ some or all of the aspects of the systems described above with respect to FIGS. 1 and 2 in order to determine the patient's position while lying in bed. For example, FIG. 3 generally shows a depth image 300 of a patient lying down in a bed. The depth image 300 can be obtained by, for example, a depth sensing camera (not shown in FIG. 3, but which can be, e.g., camera 114 shown in FIG. 1) positioned directly above the patient's bed, and the depth image 300 can optionally be displayed on a display (e.g., display 122 shown in FIG. 1). The depth image 300 can be a dynamic depth image 300 presented essentially in real time, such that the image adapts to and presents the patient's movements in real time.

In embodiments of a method for determining the patient's position, the data processing components of the system 100 described in greater detail above can be used to extract data from the depth image 300, analyze the data, and provide a determination as to the patient's position. As shown in FIG. 3, such methods may include establishing a line 301 that extends across a region of interest (ROI) 302 located over some or all of the patient. Methods for establishing the location of ROI 302 are described in greater detail above with respect to FIGS. 1 and 2. In some embodiments, the ROI 302 may encompass all of the patient's body, though as shown in FIG. 3, the ROI 302 encompasses only a portion of the patient's body, such as the patient's torso or chest. The specific location and orientation of line 301 is generally not limited. For example, the line 301 may be established halfway up the height of the ROI 302 (as generally shown in FIG. 3), three quarters up the height of the ROI 302, substantially at the top of the ROI 302, or anywhere else along the height of ROI 302. Similarly, the line 301 can be oriented substantially perpendicular to the longitudinal axis of the patient (as generally shown in FIG. 3) or at any angle to the longitudinal axis, provided that the line 301 intersects the entire width of the patient.

With continuing reference to FIG. 3, line 301 extends across the ROI 302 and intersects the patient's torso, thereby establishing a line 301 from which a cross section of the patient at the location of line 301 can be established. In some embodiments, the data processing components of the system 100 will generally extract from the depth image 300 some or all of the depth measurements taken along line 301 and present these data points on a graph 310, where the x-axis of the graph 310 is the horizontal location along the line 301, and the y-axis is the depth measurement so as to form a cross-section image 311 of the patient along line 301.

Figure 3A:
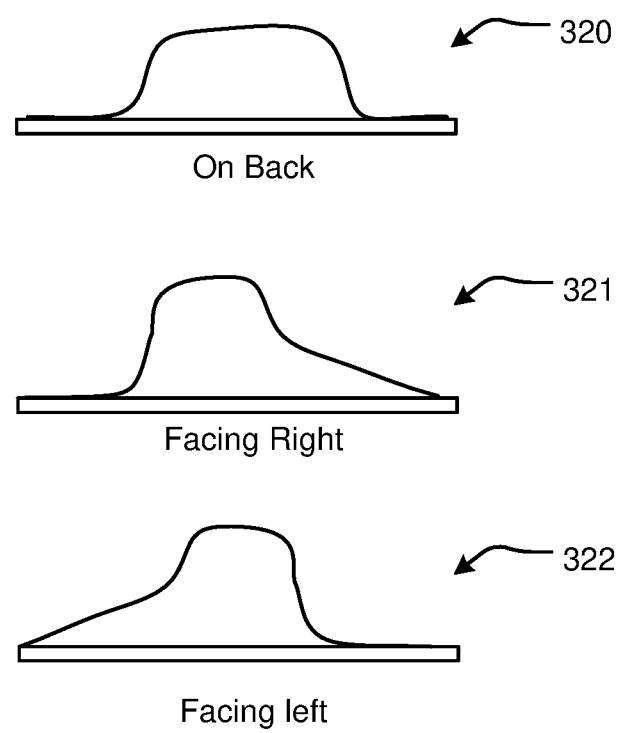
FIG. 3A is a series of standard cross-sectional depth plots suitable for use with a video-based patient monitoring system configured in accordance with various embodiments of the present technology.

Once the cross-section image 311 is established, the data processing equipment of system 100 can then analyze the shape of the curve presented in the cross-section image 311 to make a determination as to patient position. In some embodiments, determination of the patient's position using cross-section image 311 can be carried out by comparing the shape of the curve in cross-section image 311 to standard and pre-established cross-section profile images representing known patient positions. With reference to FIG. 3A, three such standard cross-section profile images are shown. Standard cross-section profile image 320 represents a model curve shape established for a patient lying on his or her back, with defining characteristics of the model curve including a generally symmetrical shape and a relatively low maximum height. Standard cross-section profile image 321 represents a model curve shape established for a patient lying on his or her right side, with defining characteristics of the model curve shape including a generally asymmetrical shape, a steep curve on the left hand side, and a more gradual slope on the right hand side. Standard cross-section profile image 322 represents a model curve shape established for a patient lying on his or her left side, with defining characteristics of the model curve shape including a generally asymmetrical shape, a steep curve on the right hand side, and a more gradual slope on the left hand side.

Comparison of cross-section image 311 to the standard cross-section profile images 320, 321, 322 can be carried out by the data processing components of the system 100 using any known comparison models wherein the closest match between the curve of the cross-section image 311 and one of the standard cross-section profile images 320, 321, 322 provides an indicator of the position in which the patient is in. With reference to FIG. 3, analysis of cross-section image 311 would yield a determination that the patient is lying on his or her back based on the closest match of the cross-section imager 311 being to the standard cross-section profile image 320 for a patient lying on his or her back.

The method described above with respect to FIG. 3 can be carried out periodically or continuously, and each determination of patient position can be recorded with a time stamp so that additional analysis of the patient position determinations can be carried out to determine for how long a patient has remained in a single position. As described in greater detail below, such information can then be used by clinicians to take preventive measures to avoid complications such as the development of pressure injuries (e.g., bed ulcers). For example, in a scenario where the periodic or continuous monitoring of patient position via the method described above with respect to FIG. 3 reveals that a patient has remained in a single position for, e.g., 30 minutes, 1 hour, 2 hours, etc., an alarm or alert can be sent to a clinician, the alarm or alert indicating to the clinician that the patient should be moved to a new position to avoid the development of pressure injuries.

Figure 4:
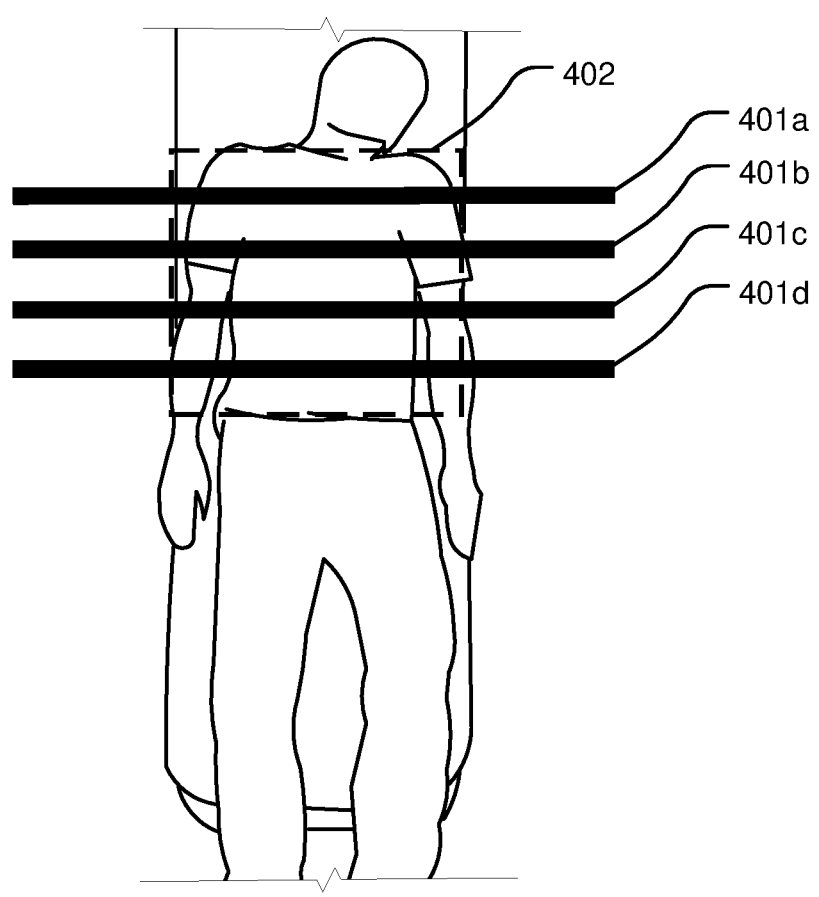
FIG. 4 is a depth sensing image obtained using a video-based patient monitoring system configured in accordance with various embodiments of the present technology.

With respect to FIG. 4, a variation on the method described above with respect to FIG. 3 employs multiple lines 401a, 401b, 401c, 401d extending through the ROI 402 to thereby develop multiple cross-section profiles images of the patient at various heights within the ROI 402. The multiple cross-section profile images based on lines 401a-401d are each developed in the same manner as described above with respect to cross-section profile image 301 such that multiple cross-section curve shapes are developed. Each cross-section profile is then compared against the standard cross-section profile images as discussed in greater detail above such that a patient position is determined for each cross-section profile image. An aggregation of these multiple determinations is then used to make single final determination as to patient position. The use of multiple lines 401a-401d and associated cross-section profile images is aimed at improving the accuracy of the patient position determination. In some embodiments, each patient position determination can be assigned a confidence score based on how closely the associated cross-section profile image matched the standard cross-section profile image, and the confidence scores can then be used to weight more heavily in the final patient position determination the closest matches.

While FIG. 4 shows the use of four lines 401a-401d, it should be appreciated that any plurality of lines (i.e., two or more) can be used in the method illustrated in FIG. 4. Similarly, the plurality of lines can be located evenly or unevenly spaced from each other and at any location across the height of the ROI 402. Furthermore, while FIG. 4 shows lines oriented generally perpendicular to a longitudinal axis of the patient, the lines can be in any orientation, including any combination of different orientations, provided the lines intersect the width of the patient body such that a full cross-section profile image can be created.

Figure 5:
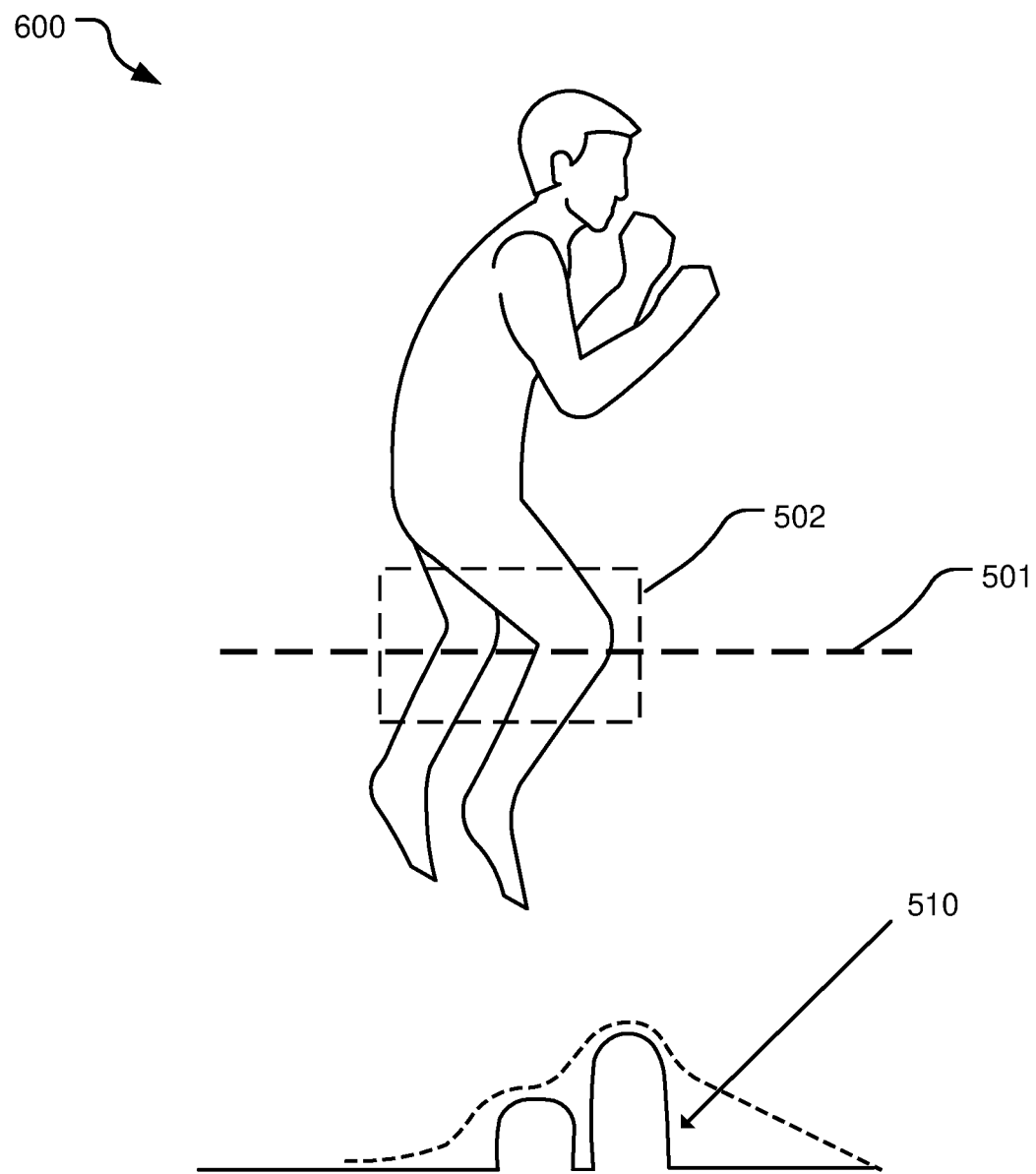
FIG. 5 is a simplified illustration of a depth sensing image and cross-sectional depth plot extracted therefrom obtained using a video-based patient monitoring system configured in accordance with various embodiments of the present technology.

With reference to FIG. 5, ROI 502 can be located at other locations about the patient body while performing similar methods to those described above with respect to FIGS. 3 and 3A. For example, and as shown in FIG. 5, ROI 502 can be located at a patient's legs, and the cross-section profile image taken along a line 501 intersecting the patient's legs can be used to determine patient position. As shown in FIG. 5, the patient is lying on his or her left side with the right leg slightly in front of the left leg. This leg orientation creates a unique cross-section profile image 510 (taken along line 501 extending through ROI 502) where the right leg being on top of and in front the left leg results in a dual hump profile shape, the hump corresponding to the right left being higher than the hump corresponding to the left leg. Similar unique cross-sectional profiles exist at a patient's legs when lying on his or her back, when lying in his or front, and when lying on his or her right side, such that the cross-section profile image taken along line 501 can be compared to standard cross-section profile images at a patient's legs established for various lying positions.

Figure 6A:
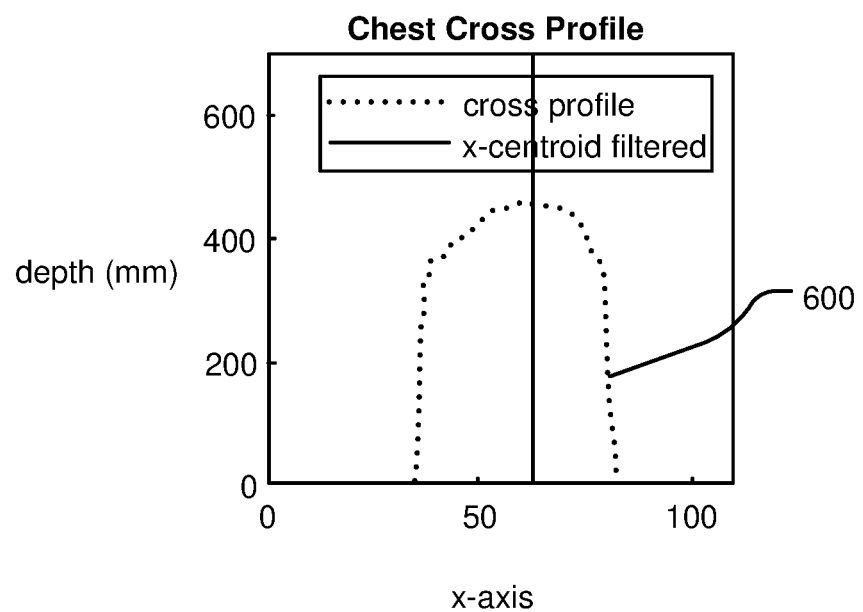
FIGS. 6A-6D are graphs generated from data collected by a video-based patient monitoring system and used in determining patient position according to various embodiments of the present technology.
Figure 6B:
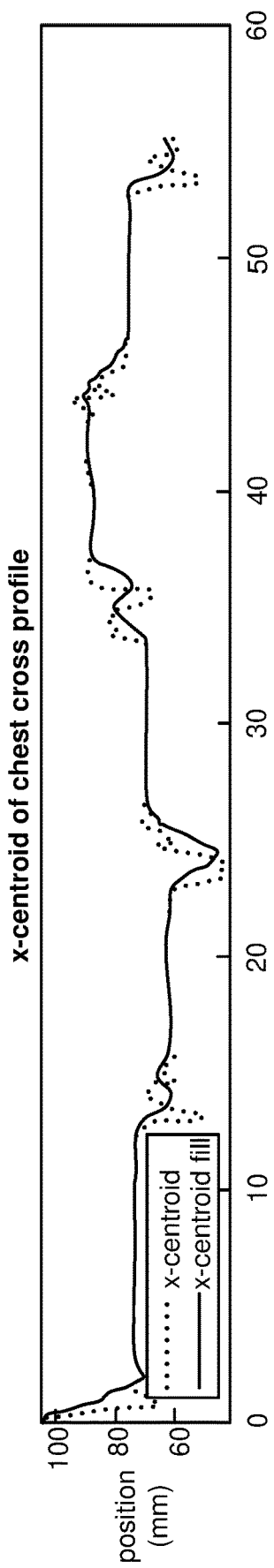

The methods described above with respect to FIGS. 3 and 4 generally use the shape of the curve in the cross-section profile image to determine patient position. In some embodiments, a centroid of the curve in the cross-section profile image can be used to determine patient position, including identifying when a turning motion is made by a patient to change from a first position to a second position, as well as to what position the patient has moved. With respect to FIG. 6A, a cross-section profile image 600 is generated in a similar manner to the methods described above with respect to FIGS. 3, 3A and 4, i.e., where a series of depth measurements taken along a line extending through an ROI are plotted to create a curve simulating the cross-sectional shape of the patient taken along the line. However, rather than compare the shape of this curve to the standard cross-section profile image for given patient positions, a centroid of the curve is determined and the horizontal position of the centroid is marked and recorded (shown via the vertical line in image 600 of FIG. 6A). The patient is continuously or periodically monitored in this manner such that the horizontal movement of the centroid can be tracked over time and plotted, as shown in FIG. 6B. In FIG. 6B, the x-axis is time, while the y-axis is the horizontal location of the centroid. As also shown in FIG. 6B, a filter can be applied to remove noise in the plot line of horizontal centroid movement as a function of time such that the overall plot line is smoothed out and outlier data points are removed or reconciled.

Figure 6C:
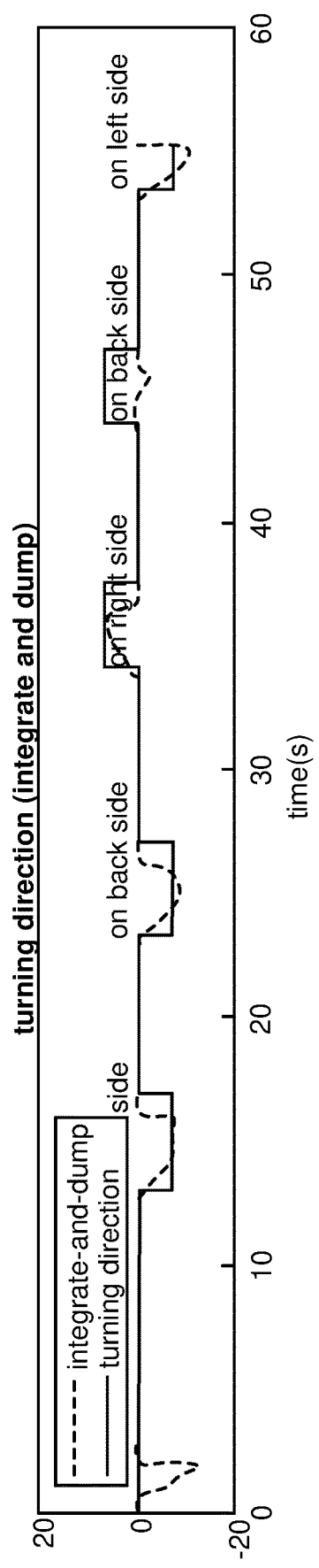
Figure 6D:
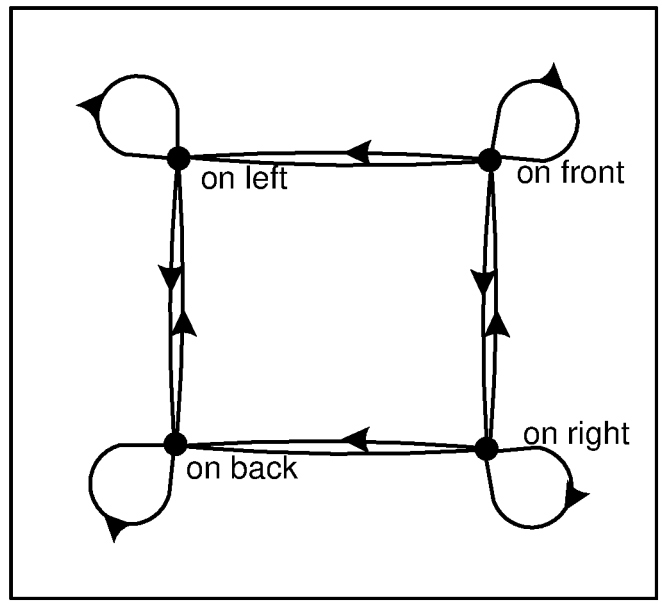

Using the plot line shown in FIG. 6B, FIG. 6C can be created and used to determine both changes in a patient's position and the position to which the patient has moved. In some embodiments, this information can be obtained by first identifying when sufficient movement of the centroid in a horizontal direction has occurred to indicate a patient movement. For example, a threshold movement value can be established for a given period of time, and the measured horizontal movement of the centroid within a given period of time must exceed the threshold value in order to signify a patient change in position. This step helps to ensure that minor movements of the centroid in the horizontal direction, such as from a patient shifting slightly to the left or right but not actually changing positions, are not classified as patient changes in position. When the horizontal movement of the centroid over a given period of time does not exceed the threshold value, this data can be ignored and/or dumped.

In contrast, when the horizontal movement of the centroid over a given period of time does exceed the threshold value to thereby indicate a patient change in position, additional calculations are carried out to determine to what position the patient has moved. With continuing reference to FIG. 6C, a local integral of the plot line in FIG. 6B is taken during the time period identified as indicating a patient movement due to sufficient horizontal movement of the centroid, and then plotted as a function of time as shown in FIG. 6C. The flat portions of the plot line shown in FIG. 6C. represent the data from FIG. 6B that has been ignored or dumped due to insufficient horizontal centroid movement. However, when sufficient horizontal centroid movement occurs, the local integral during that time period is calculated and retained, ultimately providing a positive or negative value. The positive or negative value of the local integral in combination with the known previous position of the patient and a state transition matrix for known sequences of patient movements allows for a determination to be made of which position the patient has moved to. For example, and as shown in FIGS. 6B and 6C, at 20 seconds, the patient position is known to be on his or left side. Then, at about the 25 second mark, sufficient horizontal centroid movement occurs (as shown in FIG. 6B) to indicate a patient movement such that the local integral calculation is carried out for that time period. As shown in FIG. 6C at this same period of time, the local integral calculation is shown to decrease in value. The state transition matrix associated with this method (and shown in FIG. 6D) dictates that the two possible positions to move to from "patient on the left side" are "patient on back" or "patient on front". The negative value of the local integral calculation indicates to which of the two possible patient positions the patient has moved, which in this case is to the "patient on back" position. In contrast, if the local integral value had been positive, then the state transition matrix path would have been followed to the "patient on front" option.

As shown in FIG. 6C, this calculation can be repeated each time sufficient horizontal movement of the centroid occurs to denote a patient change in position. Thus, in FIG. 6C, the patient moves again at about the 35 second mark, the 45 second mark and the 55 second mark, and the patient change in position is determined at each time period. At the 35 second mark, the local integral value is calculated to be positive. The state transition matrix indicates that the two possible positions to move to from the known position of "patient on back" are "patient on right side" and "patient on left side", and in this case, the positive local integral value indicates that the state transition matrix path to "patient on right side" is followed. As such, the method determines that the patient has changed positions to "patient on right side". At the 45 second mark, the local integral is again positive, the state transition matrix options from "patient on right side" are "patient on back" or "patient on front", and the positive local integral values directs that the state transition matrix path to "patient on back" is followed such that the patient is determined to have changed position to "patient on back". At the 55 second mark, the local integral value is negative, the state transition matrix options from "patient on back" are "patient on left side" or "patient on right side", and the negative value directs that the state transition matrix path to "patient on left side" is followed such that the patient is determined to have changed position to "patient on left side".

Any of the above-described methods or combination of the above-described methods can be used to implement an alarm system that provides a clinician with warnings, alerts, etc., when a patient has not changed positions for longer than a predetermined period of time, or in other aspects, when a patient is changing position too frequently or when a patient moves to an undesirable position. Such an alarm system can include initiating and/or sending any type of alert, notice, or alarm. In some embodiments, the alarm may take the form of an audible noise and/or visual effect, such as a flashing light or flashing portion of a display monitor. In some embodiments, the alarm may take the form of a message sent to a clinician, such as a text or email that can be sent to a mobile phone, a personal computer or laptop, or any other mobile or non-mobile device capable of communicating with the alarm system and receiving and displaying an alert.

Figure 7:
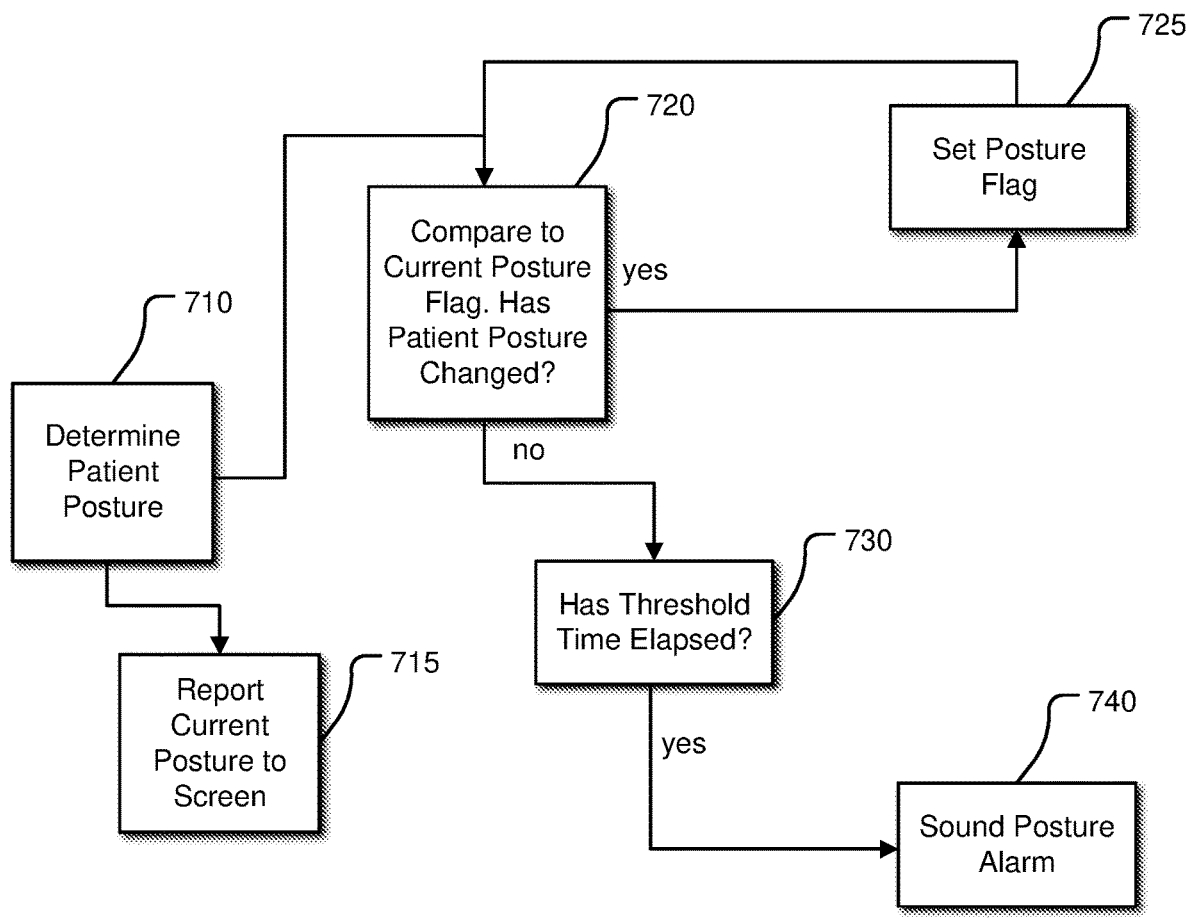
FIG. 7 is a flow chart illustrating a patient monitoring method configured in accordance with various embodiments of the present technology.

FIG. 7 illustrates a flow chart for an alarm system designed to alert a clinician to instances where a patient has not changed positions after a predetermined period of time has elapsed. The alarm system flow chart of FIG. 7 is therefore configured to assist a clinician with, e.g., preventing the occurrence of bed sores or other pressure injuries that may occur when a patient does not change positions with sufficient frequency to avoid pressure injuries. At step 710, a patient's current position is determined, such as by using any of the methods described previously, or using any other known methods for determining a patient's position (including manually noting and inputting a patient's position). At step 715, the patient's position is reported to a display, such as a computer monitor or screen of a mobile device used for monitoring the patient. The patient's position as displayed on the screen may be dynamic, such that the screen is continuously or semi-continuously displaying the most current patient position detected. Generally in parallel with step 715, the flow chart further includes step 720 in which the patient's most recently determined position obtained in step 710 and reported to a display in step 715 is compared to the patient's previously determined and recorded position. As shown in FIG. 7, step 720 may entail comparing the most recently determined positioned to a position flag previously established from the patient's previously recorded position. If the comparison carried out in step 720 determines that the patient position has changed, then the patient position flag is changed at step 725 so as to be equal to the patient position most recently determined in step 710, and future comparisons carried out at step 720 use the updated patient position flag. If the comparison carried out in step 720 determines that the patient position has not changed from the previously established patient position flag, then the flow chart proceeds to step 730, where the time that has elapsed since the patient position flag was initially set is checked to determine if the elapsed time exceeds a predetermined threshold value. For example, the predetermined threshold value may be set at 30 minutes, 60 minutes, 90 minutes, or any other value set by a clinician. When step 730 determines that the elapsed time has exceeded the predetermined threshold value, the flow chart proceeds to step 740 and an alarm is initiated. As discussed previously, the specific type of alarm and the manner in which it is delivered and/or displayed is generally not limited. If step 730 determines that the predetermined period of time has not been exceeded, then no alarm is initiated and the process repeats beginning at step 710 and a new determination of the patient's current position.

While FIG. 7 illustrates a scenario in which the alarm system is configured to initiate an alert when a patient has not changed position within a predetermined period of time, it should be appreciated that the alarm system can be modified to provide an alarm for other scenarios. For example, in an embodiment where the clinician wants to ensure that a patient is not moving too frequently, then the alarm system of FIG. 7 can be adapted to send an alarm when a patient is determined to be moving too frequently. In such a modification, step 720 is altered such that after step 720 runs a comparison of the patient's previously recorded position flag to the most recently determined patient position, the flow chart proceeds to step 730 when the patient position is determined to have changed. Furthermore, step 730 is altered such that when it is determined that the threshold value has not been exceed (i.e., the time elapsed between the patient's change in position is less than the threshold value), an alarm is sent to notify the clinician that the patient is moving too frequently.

Modifications to the alarm system can also be made to provide an alarm system that initiates an alarm when a patient moves to a position that is undesirable, such as a position that may impede a patient's treatment or recovery. In such an alarm system, step 720 remains a comparison of the patient's previously recorded position (via the set position flag) to their currently detected position, with the flow chart proceeding to step 730 when it is determined that the patient position has changed. Step 730 then becomes a comparison of the patient's currently detected position to one or more positions which have been identified and entered into the alarm system as being prohibited or undesired. For example, where a patient is recovering from a surgery during which an incision was made on their right side, the clinician may enter into the system that the patient laying on his or her right side is an undesirable position. When step 730 reveals a match between the patient's currently position and one of the identified undesired position, the alarm system can initiate an alarm as described previously. If the new position to which the patient has moved is not on the undesired list, then the flow chart may revert back to step 710.

In some embodiments, patient movement over time is tracked using the patient positioning methods described herein, and a position change metric (PCM) is calculated based on this tracking. In such embodiments, a period of time is set during which the number of position changes is calculated to determine a PCM score. The period of time may be of any length, such as one hour, and the PCM score may be calculated on a fixed or rolling basis during that period of time. In a fixed time period embodiment, the number of position changes during a set one hour period of time (e.g., from 10 am to 11 am) is counted to calculate a PCM score. In a rolling time period embodiment, the hour time period during which patient position changes are calculated is always the 60 minute time period immediately preceding the calculation of the PCM score. Regardless of the manner in which PCM is calculated, the PCM score can be displayed on a screen, such as a monitor or mobile device used for general tracking of various patient parameters.

In some embodiments, the PCM score can be integrated with an alarm system such that an alarm is initiated when the PCM score is greater than or less than a threshold value (depending on what type of condition is trying to be prevented). For example, where a clinician wants to limit the amount of patient position changes, an alarm would be initiated if the PCM score exceeds the threshold value. In contrast, where a clinician wants to ensure a minimum amount of movement is occurring, the alarm would be initiated when the PCM score does not exceed the threshold value. Any threshold value can be set by the clinician, such as 10 position changes per hour, 30 position changes per hour, etc. When an alarm is initiated, the alarm can be an audible and/or visual alarm. For example, on a screen used to track and display various patient parameters, the PCM score can be displayed and begin to flash or change color when an alarm is initiated. The alarm can also take the form of an alert or message sent to a mobile device.

Previous embodiments described herein provide various methods for determining a patient's position, some or all of which use one or more types of imaging/video capture devices to determine a patient's position. For example, as described in greater detail previously, a depth sensing camera can be used in various ways to determine a patient's cross-sectional profile from which a determination of patient position can be made. In some alternate embodiments, determining a patient's position through use of one or more types of imaging/video capture devices can be carried out using artificial intelligence (AI). In such embodiments, and as described in greater detail below, AI-based methods are used to train a system (e.g., a machine learning model) to identify a patient's position based at least in part on a data set of previously identified patient positions, with the AI-based method generally improving in accuracy of position determination as the data set of identified patient positions grows.

Any suitable AI-based method or model can be used together with one or more imaging/video capture devices to create an AI-based system for determining a patient's position. For example, a machine learning model, such as a multilayer deep neural network, may be trained to recognize a patient's position within any type of image captured by an imaging device associated with the system. In this regard, the AI-based system may be configured similar or identical to the system 100 shown in FIG. 1, but with the addition of a machine learning module in the computing device 115 (e.g., as part of memory 126).

The network used for AI-based methods may be developed through transfer learning of existing neural networks, such as Alexnet, ResNet, GoogLeNet, etc., or it may be developed from scratch and include layers such as input layer, convolutional layer, relu layer, pooling layers, dropout layers, output layers, softmax layer, etc. The machine learning model can be trained based on a data set of patient images where at least some of the patient images are pre-labeled with an accurate/correct patient position. The pre-labeled images allow for the machine-learning model to be trained to identify non-labeled images. In some embodiments, the machine-learning model can be trained to identify one or more of the following positions: left, right, prone, supine, sitting, no patient, and multiple persons.

Figure 8:
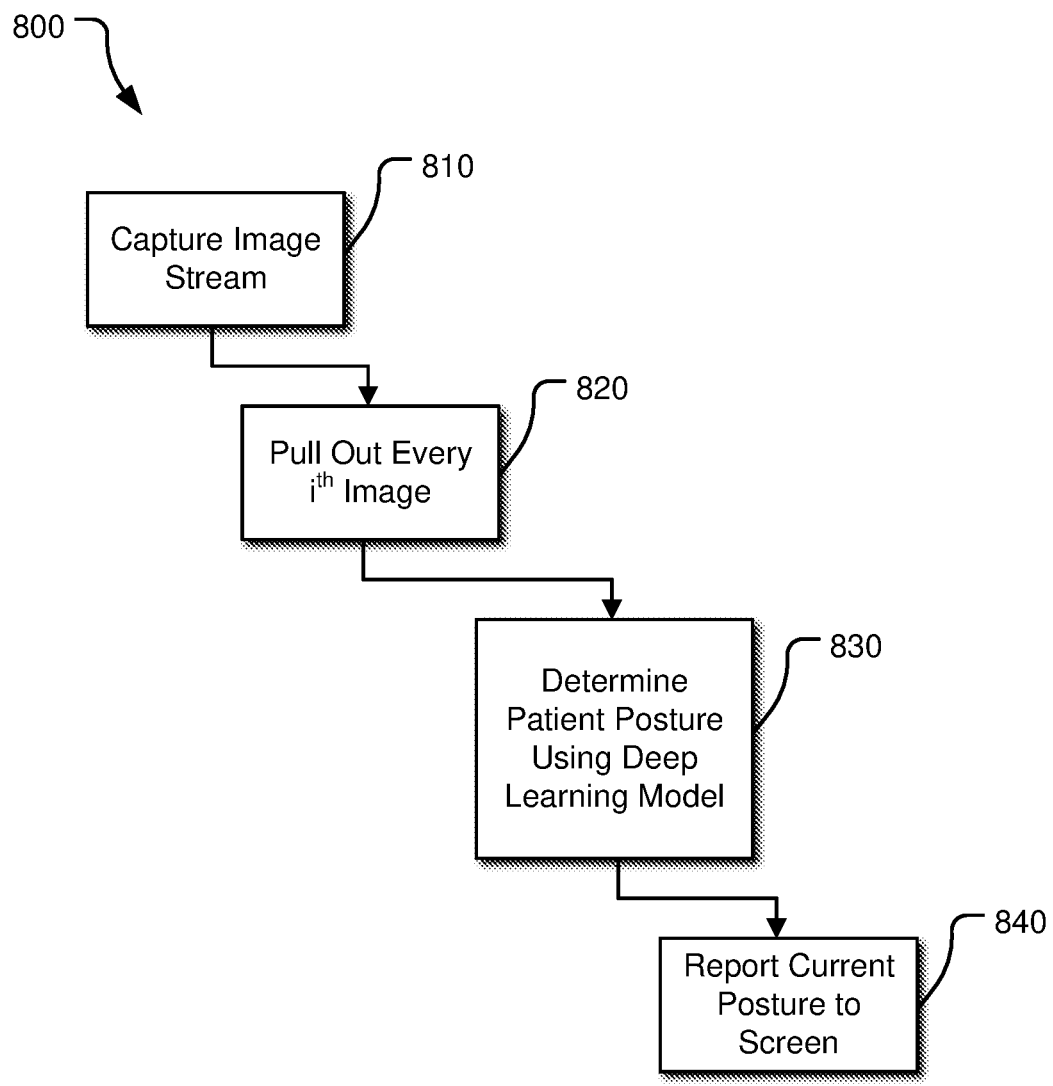
FIG. 8 is a flow chart illustrating a patient monitoring method configured in accordance with various embodiments of the present technology.

With reference to FIG. 8, a method 800 for using a machine learning model in conjunction with a video stream of the patient to monitor and determine patient position is illustrated. The video stream used in the implementation of method of FIG. 8 provides a continuous view of the patient by virtue of multiple images (i.e., frames) taken during a time period. For example, in some embodiments, the video feed provides 60 frames per second, thereby providing 60 individual images of the patient per second. In step 810 of method 800, this video stream providing multiple frames per time period is captured for processing by the machine learning model. While the machine learning model can be set to analyze every frame and provide a position determination for each frame, step 820 can include pulling out every $i^{th}$ image that makes up the video stream and analyzing only that image to save on computational power. For example, in some embodiments, step 820 may be set to pull out every 60th image of the video stream such that the machine learning model is analyzing one frame per second of the video stream. The number of images pulled out for analysis is generally not limited, and can be greater than or less than every $60^{th}$ image, such as every $2^{nd}$ $3^{rd}$, $10^{th}$, $90^{th}$, $120^{th}$, etc. image. In step 830, each pulled out image is analyzed to determine patient position, such as through the use of a machine learning model (e.g., deep learning model) as described previously. In step 840, the determined position is reported to a screen, display or the like so that a clinician is provided a continuous or semi-continuous indication of the patient position. As previously described, such a manner of determining patient position can be incorporated into various alarm systems.

The AI-based methods and/or systems for identifying a patient position (including training the machine learning model to recognize various patient positions based on a data set of patient positions) described herein may utilize any type of imaging modalities. In embodiments of the method described previously with respect to FIG. 8, an RGB image may be used to pull out periodic frames of the RGB video stream, analyze the frames, and provide a determination as to the patient's position. In other embodiments, the method may use other imaging modalities, such as IR, depth, thermal, etc. Furthermore, in some embodiments, the AI-based systems and methods may use more than one imaging modality in an effort to improve position determination.

Figure 9:
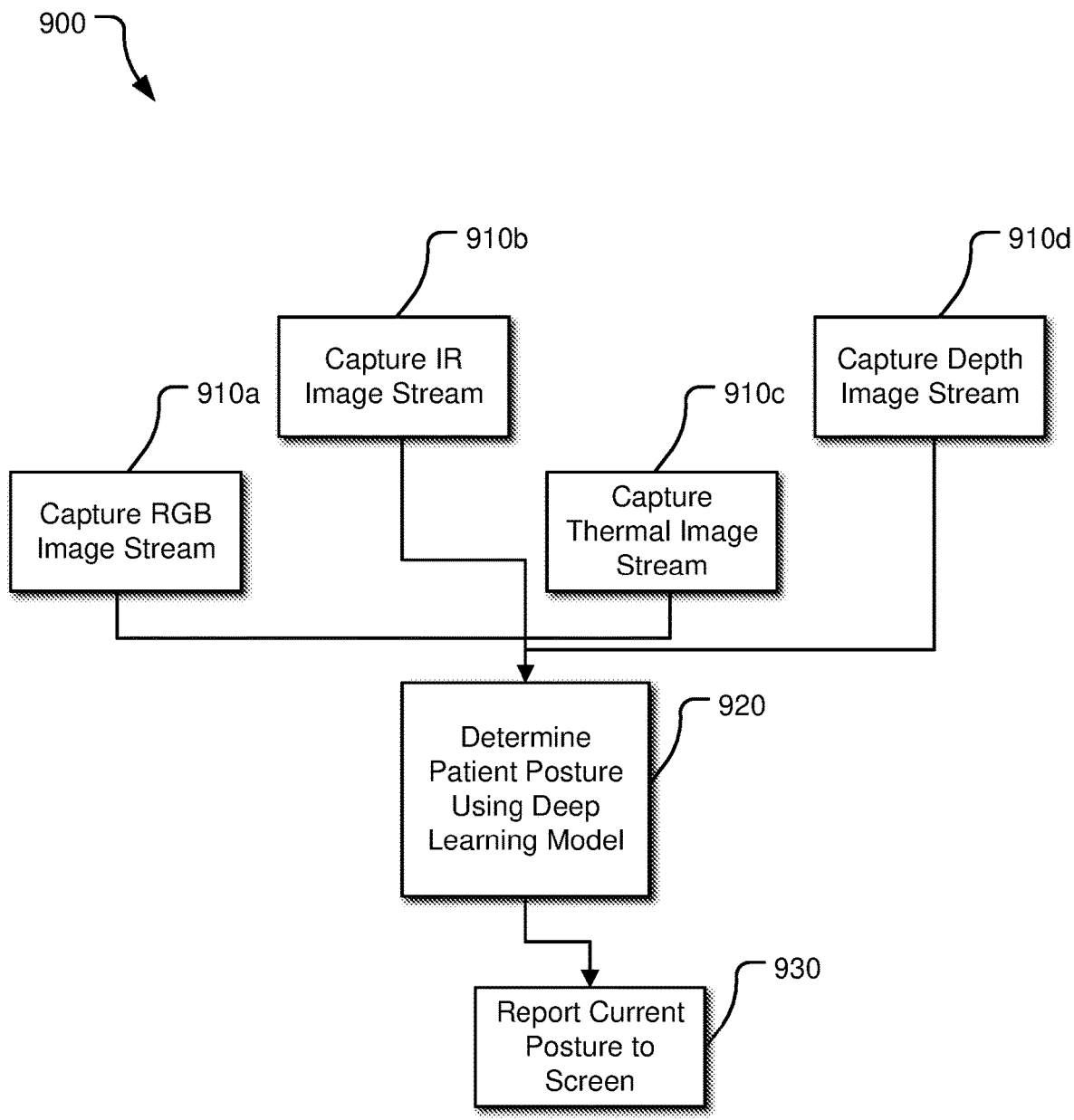
FIG. 9 is a flow chart illustrating a patient monitoring method configured in accordance with various embodiments of the present technology.

With reference to FIG. 9, a flow chart for a method 900 using multiple imaging modalities fed into a single deep learning module to determine a patient position is shown. In this regard, the method 900 may begin with steps 910a, 910b, 910c, 910d, where each step includes capturing an image stream from a different imaging modality. For example, as shown in FIG. 9, step 910a includes capturing an RGB image stream, step 910b includes capturing an IR image stream, a step 910c includes capturing a thermal image stream, and step 910d includes capturing a depth image stream. The method 900 may include additional image streams not mentioned above, fewer image streams than shown in FIG. 9, or any combination of any number of image streams. While FIG. 9 does not show pulling out specific images within each image stream as shown in FIG. 8, the method 900 of FIG. 9 may include this feature such that only an $i^{th}$ image from each stream is sent to the machine learning module for analysis. In such embodiments, each stream may use the same rate of images pulled from the image stream, or each image stream may use its own unique rate for pulling out images to be processed. The method 900 of FIG. 9 may also include a scenario in which some image streams have an image pulled out at set rate, while other image streams send every image to the machine learning module for processing.

In step 920, each of the image streams 910a, 910b, 910c, and 910d are sent to the machine learning module, which processes the data to determine the patient position. As noted previously, the machine learning module can use a deep learning model whereby the module is trained to identify the patient position at least in part from previously processed images where the position was correctly identified. In the method 900 shown in FIG. 9, the machine learning module is developed such that it is capable of processing and analyzing the different types of imaging streams to thereby make position determination based on the combination of the various types of images. In some embodiments, each image stream provides an image to the machine learning module that is from the same time such that the machine learning module may package these "same time" images together during analysis and use each piece of data within the package to determine the patient position. In such embodiments, the machine learning module may have been trained on such packages to thereby provide a machine learning module specifically adapted to analyze packages of images from different image modalities to thereby making a patient position determination.

Following determination of the patient position by the machine learning module, the determined patient position may be reported to a screen, display, etc. in step 930 and as described in greater previously with respect to reporting determined patient positions.

Figure 10:
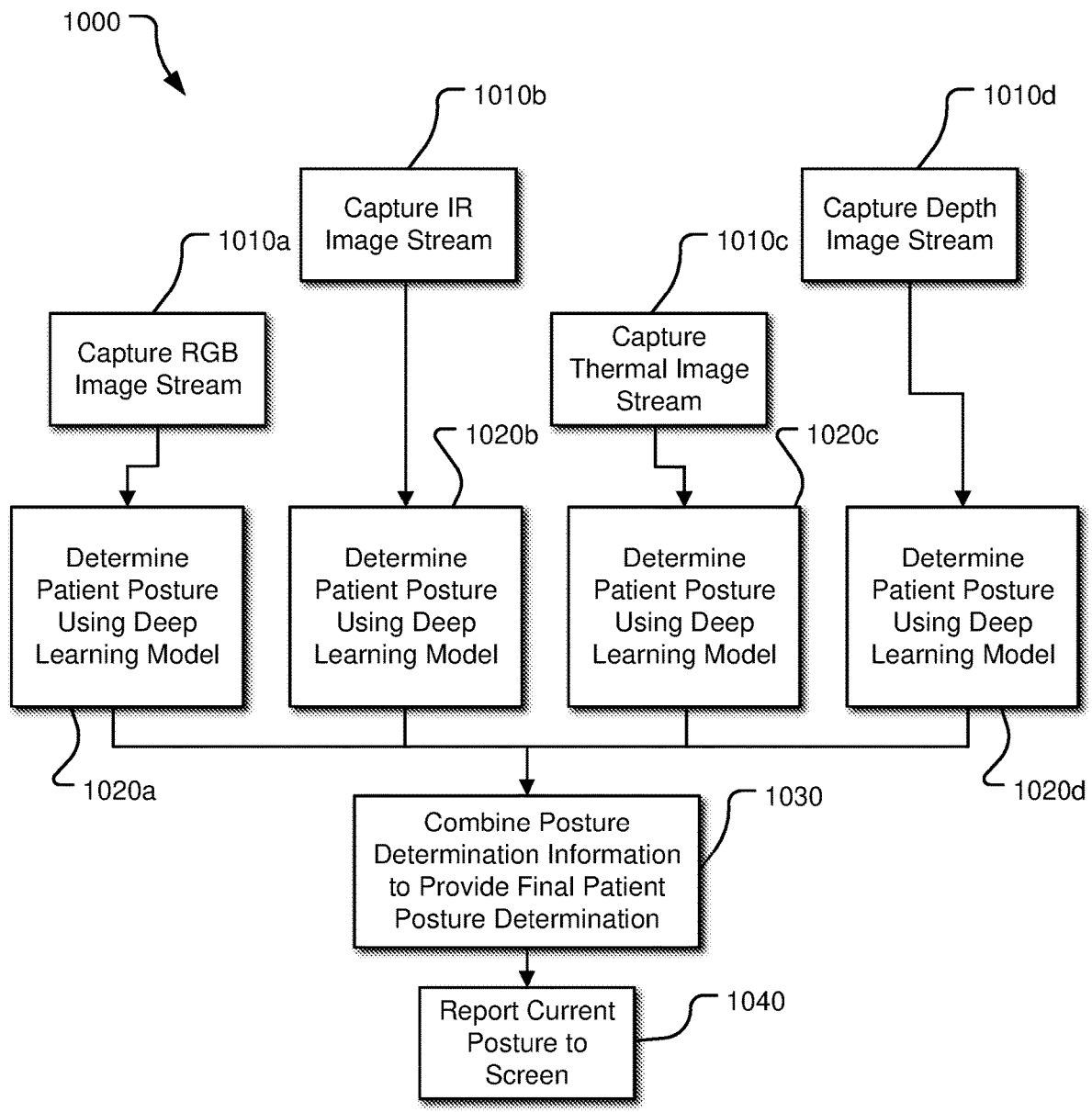
FIG. 10 is a flow chart illustrating a patient monitoring method configured in accordance with various embodiments of the present technology.

FIG. 10 illustrates a modification to the method 900 described previously wherein rather than provide a single machine learning module that receives all image streams and processes the image streams together to make a patient position determination, the method 1000 includes a machine learning module for each image stream captured as part of the method. Accordingly, and as shown in FIG. 10, the method 1000 can begin similar to method 900 wherein step 1010a includes capturing an RGB image stream, step 1010b includes capturing an IR image stream, a step 1010c includes capturing a thermal image stream, and step 1010d includes capturing a depth image stream. However, unlike method 900, method 1000 then includes a step 1020a of determining a patient position from the RGB image stream using a machine learning module specifically dedicated to that task, a step 1020b of determining a patient position from the IR image stream using a machine learning module specifically dedicated to that task, a step 1020c of determining a patient position from the thermal image stream using a machine learning module specifically dedicated to that task, and a step 1020d of determining a patient position from the depth image stream using a machine learning module specifically dedicated to that task. In this manner, each machine learning module associated with each image stream need only be trained for determining patient position based on one specific type of image modality.

Method 1000 further includes a step 1030 wherein the position determination made by each machine learning module is combined to make a final patient position determination. In some embodiments, each determination can be equally weighted or assigned a predetermined weight based on the general accuracy associated with each image stream. In other embodiments, each machine learning module may assign a confidence score to each individual determination, and these confidence scores may then be used as part of determining the final patient position from the combination of determinations made in steps 1020a-1020d. In this regard, the method 1000 may provide improved accuracy when determining patient position since it accounts for a scenario in which a specific patient position that might be difficult to determine via one type of image modality is compensated for by analyzing other image modalities which may not experience the same difficulties in determining patient position. For example, while a depth image stream may accurately determine when a patient position is "on the right" or "on the left", it may experience more difficulty in making an accurate prediction for "on back" and "on front". To compensate for this, another image modality (e.g., RGB) may accurately determine "on back" and "on front" positions, and these strengths and weaknesses can be built into the final position determination performed in step 1030.

It should be appreciated that any manner of combining the individual determinations to make a final determination can be used in step 1030. In addition to assigning a confidence score to each individual determination and using the confidence scores as part of the final determination, other methods include simply reporting the position associated with the highest confidence score; reporting the most prevalent position determined from the individual determinations (i.e., if three image streams report the same position while the fourth image stream reports a different position, then the position determined from the three image streams is reported); or the multiple position probabilities may be fed into a small neural network or other learner (e.g. SVM, Decision Tree, Random Forest, KNN, etc.) and that model used to generate the final label and an associated probability Following final determination of the patient position from the combined determinations of each image stream, the final determined patient position may be reported to a screen, display, etc. in step 1040 and as described in greater previously with respect to reporting determined patient positions.

Methods 900 and 1000 may also account for and adapt to scenarios in which one or more image streams fail, such as in the case of equipment malfunction or if a camera for one of the image modalities becomes obscured. In such instances, the method 900 and 1000 may be programmed to automatically adapt and continue forward without the failed image stream. For example, in method 900, step 920 where the patient position is determined can still be carried out if image stream 910*a* is not received by the machine learning module. That is to say, the machine learning module will proceed to make a position determination based on the available data, which in this case would be data from image streams 910*b*, 910*c*, and 910*d*. Similarly, in method 1000, step 1030 where the final patient position is determined from a combination of individual patient positions can still be carried out if no patient determination is provided by, e.g., the machine learning module for the RGB image stream due to no RGB data being received in step 1020*a*. That is to say, step 1030 will proceed based on the combination of the available individual determinations, which in this case would be a position determination from 1020*b*, 1020*c*, and 1020*d*. In such scenarios where the position determination comes from less than all possible image streams, this information (i.e., that the determination is being made on less than all possible image streams) can be displayed on the clinician's monitor, screen, etc. along with the position determination.

Figure 11:
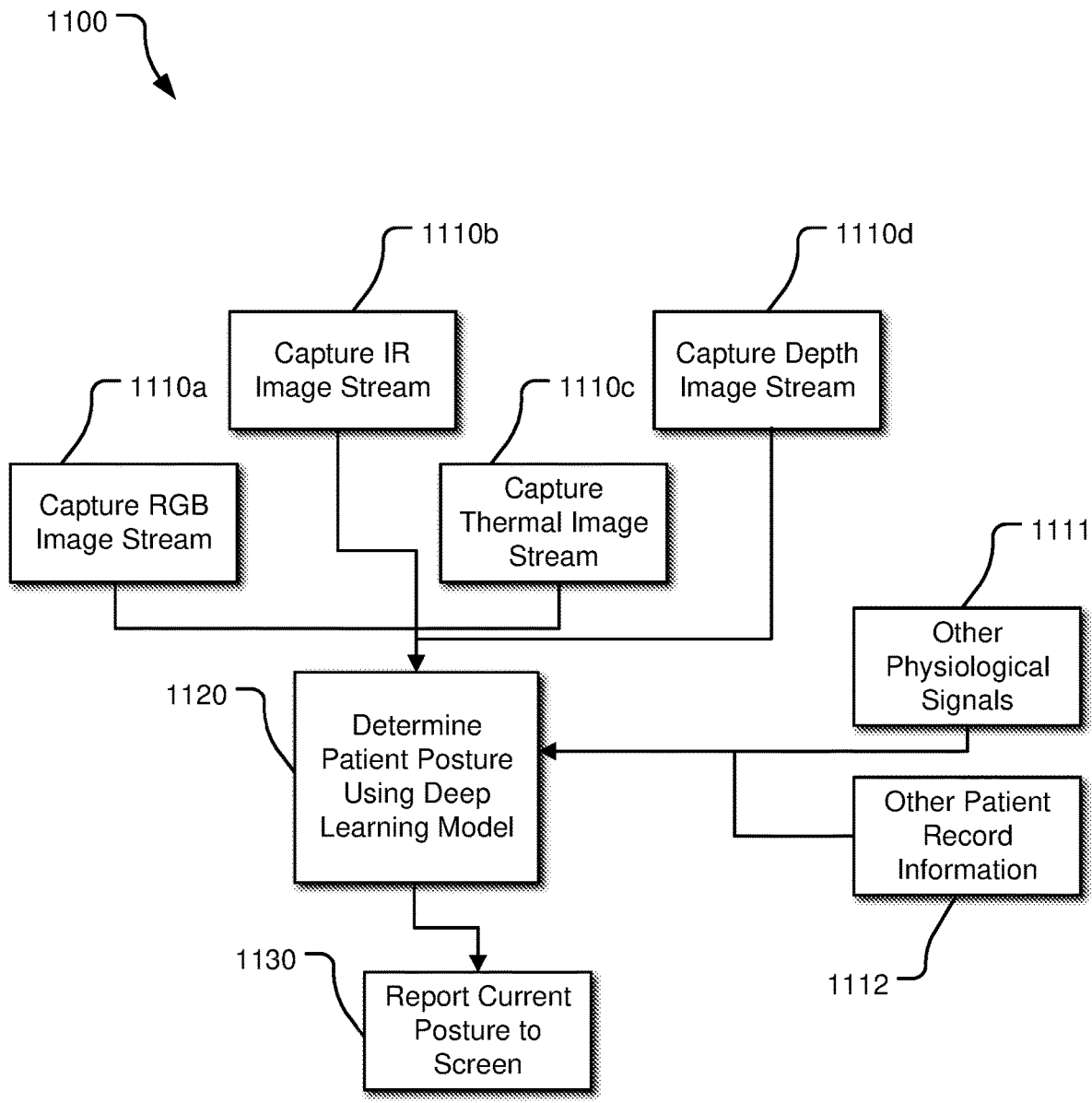
FIG. 11 is a flow chart illustrating a patient monitoring method configured in accordance with various embodiments of the present technology.

FIG. 11 illustrates a method 1100 similar to method 900 illustrated in FIG. 9, but wherein additional non-image stream information is delivered to the machine learning model. Thus, as in method 900, method 1100 may begin by capturing multiple image streams, such as RGB image stream in step 1110*a*, IR image stream in step 1110*b*, thermal image stream in step 1110*c*, and depth image stream in step 1110*d*, and delivering images from these streams to the machine learning module so that the machine learning module can determine the patient position in step 1120. As shown in FIG. 11, additional non-image stream information is also provided to the machine learning module so that this information may optionally be used as part of the determination of the patient position in step 1120. For example, physiological signal information collected in step 1111 may be input to the AI model. Physiological information may, for example, be raw signals such as ECG, EEG, EMG, PPG, blood pressure, etc., or derived signals such as SpO$_2$, heart rate, respiratory rate, tidal volume, etc., including any combination thereof. Additionally, patient record information collected in step 1112 may also optionally be added to the AI model, such as demographic information (height, age, weight, BMI, skin pigmentation, etc.), or prior health record data such as previous surgeries, recent events, amputated limbs, notable facial features including scars, etc. A previous image, or several historical images, of the patient may also be entered. Any combination of the information collected in steps 1111 and 1112 may be used by the machine learning model to improve patient position determinations.

Figure 12A:
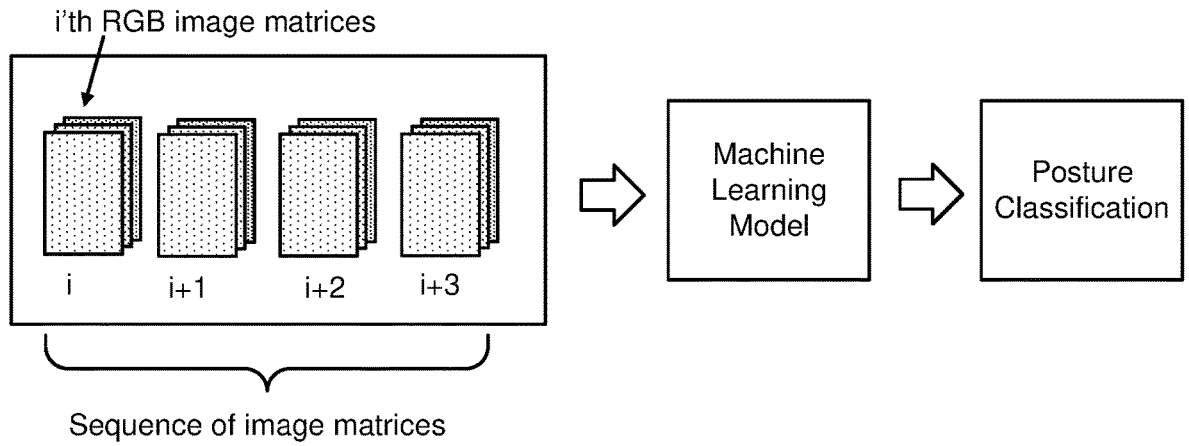
FIGS. 12A-12C are flow charts illustrating patient monitoring methods configured in accordance with various embodiments of the present technology.
Figure 12B:
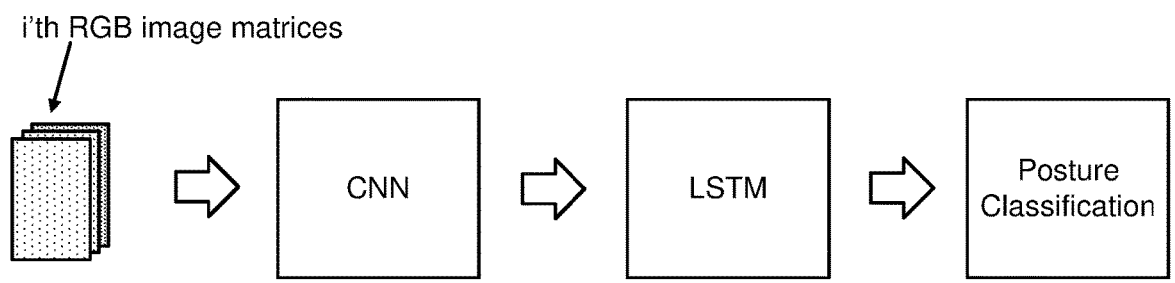
Figure 12C:
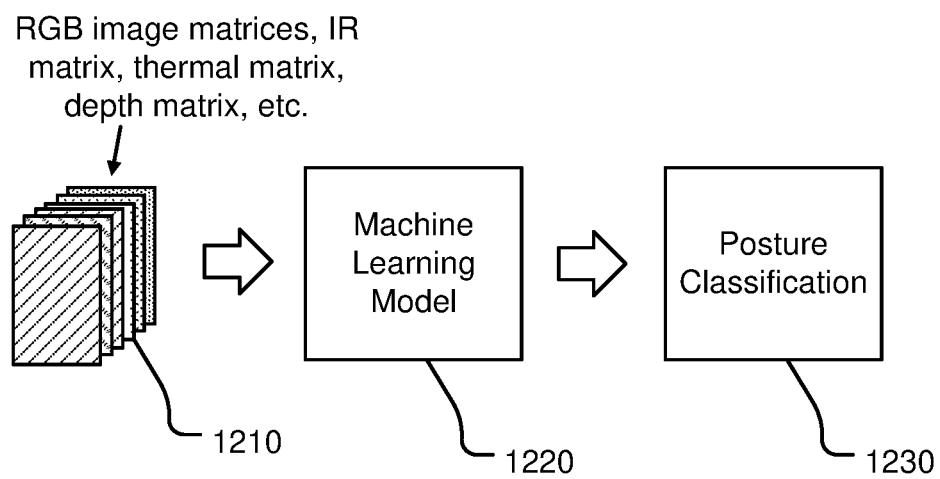

With reference to FIGS. 12A-12C, in an embodiment of the AI-based methods for determining patient position as described herein, a sequence of images may be input into a machine learning model, and the sequence of images may be used to determine patient position. In the non-limiting example shown in FIG. 12A, a sequence of RGB images (each instance in time comprising a matrix of RGB images) are captured in step 1210, then sent to the machine learning module in step 1220. To account for the use of a sequence of images to determine patient position, the machine learning model of step 1220 may incorporate layers that are optimized for analyzing images (such as a CNN layer) and layers optimized for analyzing sequences (such as an LSTM layer). Alternatively, and as shown in FIG. 12B, rather than input a whole sequence of images, each RGB image (comprising a matrix of the RGB images) may be entered into the machine learning module separately to a machine learning module including combined CNN-LSTM layers, and an inbuilt memory of the LSTM deals with the temporal sequencing of the input data. In either embodiment, a position classification is output from the machine learning module in step 1230.

While FIGS. 12A and 12B illustrate an embodiment where RGB images serve as the input to the machine learning module, it should be appreciated that the methods of FIGS. 12A and 12B can also be used with other image modalities, such as IR, depth or thermal images. Furthermore, the methods of FIGS. 12A and 12B can be used when a combination of one or more image modalities are input into the machine learning module. For example, as shown in FIG. 12C, RGB, IR, thermal and depth images (each in its own matrix form) are all provided in step 1210 and delivered together to the machine learning module for position determination in step 1220.

With respect to all of the AI-based methods described previously, it should be appreciated that the images used in the development of the model and or in the use of the model in practice may be preprocessed using rotations, cropping, etc. Such preprocessing may be done to improve the training of the model and/or the output (i.e., position determination) of the model. In the device, it may be desirable to align the images to the same reference frame before feeding them into the deep network, for example: by finding the edges of the bed and rotating the image accordingly.

Furthermore, in any of the AI-based methods described herein, the images from each camera modality may be registered with each other prior to implementation. This may be possible if the cameras are on similar lines of sight, or if the camera geometry is fixed and known (e.g., a rigid rig is installed to hold the multiple cameras). However, a system where the cameras' lines of sight are distinctly different may also be used, so that when one is obscured, the other cameras still collect relevant information.

In any of the embodiments of the methods described herein, multiple cameras of the same type may be used, e.g., more than one RGB camera, more than one IR camera, etc.

In any of the embodiments described herein, various methods may be employed to identify and isolate the subject in the frame and then crop the subject within the frame, or part of a subject, before inputting the images into the model. For example, facial recognition, skeleton methods, bounding box methods, etc., or any combination thereof may be used. These methods may also be used to prevent inputting the images if a person is not in frame, which can reduce false positives and also the CPU requirements of the application which may be important if the system is on battery power.

In any of the methods described herein wherein data processing is carried out as part of determining patient position, the data processing components of the system 100 described in greater detail above can be used. This includes, but is not limited to, extracting data from image streams and processing such data to make patient position determinations, including any sequence of data analysis where data is sequentially manipulated into one or more forms to arrive at a final patient position determination.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A video-based patient monitoring method, comprising:
   obtaining a depth image of a region of interest of a patient using a depth sensing camera, the depth image comprising a plurality of depth measurements taken within the region of interest;
   sending the depth image to a microprocessor through a wired or wireless connection;
   extracting, by the microprocessor, from the depth image a subset of the plurality of depth measurements, the subset of depth measurements taken along a line extending through the region of interest;
   creating a cross-section profile image based on the subset of depth measurements;
   creating, from the profile image, a simulated curve simulating a cross-sectional shape of the patient taken along the line;
   comparing, with the microprocessor, the cross-section profile image to a plurality of standard cross-section profile images, each of the standard cross-section profile images comprising a model curve shape associated with a body position,
   wherein the comparing comprises identifying a closest match between the simulated curve and one of the model curve shapes;
   making a determination of a current position of the patient based on the closest match;
   displaying the current position of the patient on a display, comprising dynamically updating the display with the current position;
   tracking the current position of the patient over time, comprising comparing the current position to a previous position;
   calculating a position change metric based on the tracking;
   and initiating an alarm upon determining that the position change metric crosses a threshold.

2. The method of claim 1,
   wherein the region of interest is located over the patient's chest.

3. The method of claim 1,
   wherein the line extending through the region of interest crosses through the patient's chest.

4. The method of claim 1,
   wherein the line extending through the region of interest crosses through the patient's chest and is oriented generally perpendicular to a longitudinal axis of the patient.

5. The method of claim 1,
   wherein the plurality of standard cross-section profile images includes at least:
   a standard cross-section profile image for a patient lying on their back;
   a standard cross-section profile image for a patient lying on their right side;
   and a standard cross-section profile image for a patient lying on their left side.

6. The method of claim 1,
   wherein the location of the region of interest is determined by:
   employing a facial recognition algorithm to identify the location of the patient's face;
   estimating the location of the patient's chest based on the identified location of the patient's face;
   and locating the region of interest at the estimated location of the patient's chest.

7. The method of claim 1,
   wherein the region of interest has a height,
   and wherein the line extending through the region of interest is located half way up the height of the region of interest, three quarters of the way up the height of the region of interest, or at the top of the height of the region of interest.

8. The method of claim 1,
   wherein:
   extracting the subset of depth measurements comprises extracting first and second subsets taken along first and second lines extending through the region of interest;
   creating the cross-section profile image based on the subset of depth measurements comprises creating first and second cross-section profile images for the first and second lines respectively;
   creating the simulated curve comprises creating first and second simulated curves from the first and second profile images respectively;
   comparing the cross-section profile image comprises identifying a first closest match between the first simulated curve and a first one of the model curve shapes and identifying a second closest match between the second simulated curve and a second one of the model curve shapes;
   making a determination of the current position of the patient comprises developing first and second determinations from the first and second closest matches respectively;
   and wherein the first and second determinations of the current position of the patient are used together to make a final determination regarding the current position of the patient.

9. The method of claim 8,
   wherein each of the first and second lines extending through the region of interest crosses through the patient's torso and is oriented generally perpendicular to a longitudinal axis of the patient.

10. The method of claim 8,
wherein each of the first and second determinations is assigned a confidence score, and the confidence scores are used in making the final determination.

11. A video-based patient monitoring method, comprising:
receiving, at a microprocessor, a video stream comprising depth images of a region of interest of a patient located over the patient's chest;
continuously extracting, by the microprocessor, a subset of depth measurements from the video stream, the subset taken along a line extending through the region of interest;
continuously creating a cross-section profile of a patient, the cross-section profile being based on the subset of depth measurements;
continuously determining a centroid of the cross-section profile;
tracking a horizontal movement of the centroid over time, comprising applying a filter to remove noise from the tracked horizontal movement over time;
detecting that the horizontal movement of the centroid exceeds a threshold;
determining that a patient movement has occurred based on the detecting;
following a state transition matrix to determine a current body position of the patient, the state transition matrix comprises a set of patient positions, the set of patient positions comprising at least lying on back, lying on front, lying on right side and lying on left side and a plurality of sequences of patient movements between the set of patient positions;
continuously displaying the current body position of the patient by dynamically updating the display with the current position;
monitoring elapsed time between patient movements;
and initiating an alarm when the elapsed time crosses a threshold.

12. The method of claim 11,
wherein determining the patient movement has occurred comprises:
integrating a plot of the centroid location over time to determine a positive or negative value;
and following the state transition matrix based on the positive or negative value to determine the current body position.

13. The method of claim 11,
wherein the line extending through the region of interest crosses through the patient's chest and is oriented generally perpendicular to a longitudinal axis of the patient.

14. The method of claim 11,
wherein detecting that the horizontal movement of the centroid exceeds a threshold comprises:
calculating a change in the horizontal location of the centroid from a first time to a second time and comparing the change in horizontal location to the threshold, the threshold being a value over which a patient movement is considered to have occurred.

15. A video-based patient monitoring method, comprising:
obtaining, from a depth sensing camera, a video stream of depth measurements within a region of interest covering at least a portion of a patient;
extracting, from the video stream, multiple subsets of depth measurements taken along multiple lines extending through the region of interest at the same time at different locations;
creating multiple cross-section profile images based on the multiple subsets;
developing multiple shape curves from the multiple cross-section images;
comparing the multiple shape curves to a plurality of standard body position curves, each of the standard body position curves being associated with a different body position;
making a determination of the patient's current position based on the comparing;
displaying the current position on a display, comprising dynamically updating the display with the current position;
and initiating an alarm upon determining that the current position matches a prohibited position or fails a change metric.

16. The method of claim 15,
wherein the plurality of standard body position curves comprises a back position curve, a right side position curve, and a left side position curve, each having a distinct curvature.

17. The method of claim 1,
wherein creating the simulated curve comprises creating multiple simulated curves simulating multiple cross-sectional shapes of the patient taken along different lines extending through the region of interest,
and wherein identifying the closest match comprises identifying a closest match for each of the multiple simulated curves thereby developing multiple determinations of the closest match,
and wherein making a determination of the current position of the patient comprises aggregating the multiple determinations of the closest match.

* * * * *